(12) United States Patent
Sajima

(10) Patent No.: US 8,753,560 B2
(45) Date of Patent: *Jun. 17, 2014

(54) MOLD FOR GOLF BALLS

(75) Inventor: Takahiro Sajima, Kobe (JP)

(73) Assignee: SRI Sports Limited, Kobe (JP)

( * ) Notice: Subject to any disclaimer, the term of this patent is extended or adjusted under 35 U.S.C. 154(b) by 158 days.

This patent is subject to a terminal disclaimer.

(21) Appl. No.: 12/232,518

(22) Filed: Sep. 18, 2008

(65) Prior Publication Data

US 2009/0102097 A1   Apr. 23, 2009

(30) Foreign Application Priority Data

Oct. 19, 2007   (JP) ................................. 2007-272204
Oct. 19, 2007   (JP) ................................. 2007-272347

(51) Int. Cl.
*A63B 45/00* (2006.01)
*B29C 45/37* (2006.01)
*A63B 37/00* (2006.01)
*B29L 31/54* (2006.01)

(52) U.S. Cl.
CPC .............. *A63B 45/00* (2013.01); *B29C 45/372* (2013.01); *B29L 2031/546* (2013.01); *A63B 37/0006* (2013.01); *A63B 37/0018* (2013.01); *A63B 37/002* (2013.01)
USPC ...................... 264/328.1; 264/328.9; 473/378

(58) Field of Classification Search
CPC .. A63B 45/00; B29C 45/372; B29L 2031/546
USPC .................................... 264/299, 328.1, 328.9
See application file for complete search history.

(56) References Cited

U.S. PATENT DOCUMENTS

| | | | | | |
|---|---|---|---|---|---|
| 4,804,189 | A | * | 2/1989 | Gobush ......................... | 473/384 |
| 5,044,638 | A | * | 9/1991 | Nesbitt et al. .................. | 473/383 |
| 5,720,676 | A | * | 2/1998 | Shimosaka et al. ............ | 473/384 |
| 5,874,038 | A | * | 2/1999 | Kasashima et al. ............ | 264/279 |
| 5,947,844 | A | * | 9/1999 | Shimosaka et al. ............ | 473/379 |
| 6,123,534 | A | | 9/2000 | Kasashima et al. | |
| 2002/0010039 | A1 | | 1/2002 | Ogg | |

(Continued)

FOREIGN PATENT DOCUMENTS

| | | |
|---|---|---|
| CN | 1462199 A | 12/2003 |
| CN | 101002986 A | 7/2007 |

(Continued)

*Primary Examiner* — Atul P. Khare
(74) *Attorney, Agent, or Firm* — Birch, Stewart, Kolasch & Birch, LLP

(57) ABSTRACT

Mold 2 includes a pair of mold halves (upper mold half 4 and lower mold half 6). A spherical cavity is formed by mating upper mold half 4 and lower mold half 6. A large number of pimples 10 are provided on the cavity face of the upper mold half 4 and lower mold half 6. The upper mold half 4 and the lower mold half 6 have flat plane 14, protrusion 16 and recess 18, respectively. The protrusion 16 projects from the equator Eq. The recess 18 is depressed from the equator Eq. The protrusion 16 includes a part of the pimple 10. The proportion P1 of the number of the protrusion 16 that is adjacent to other protrusion 16 belonging to other mold half distinct from the mold half to which itself belongs, to the total number of the protrusions 16 is equal to or greater than 50%. The proportion Pw of the sum total of the widths of the protrusions 16 measured along the equator, to the entire length of the equator is equal to or greater than 35%.

20 Claims, 18 Drawing Sheets

(56) References Cited

U.S. PATENT DOCUMENTS

| | | |
|---|---|---|
| 2002/0094886 A1 | 7/2002 | Sajima |
| 2004/0041297 A1 | 3/2004 | Sajima et al. |
| 2006/0068931 A1 | 3/2006 | Aoyama et al. |
| 2006/0193934 A1* | 8/2006 | Aoyama et al. ............... 425/116 |
| 2007/0167257 A1 | 7/2007 | Sullivan et al. |
| 2007/0173354 A1 | 7/2007 | Sajima |

FOREIGN PATENT DOCUMENTS

| | | |
|---|---|---|
| CN | 101003162 A | 7/2007 |
| JP | 10-99469 A | 4/1998 |
| JP | 10-127826 A | 5/1998 |
| JP | 11-137727 A | 5/1999 |
| JP | 2002-159598 A | 6/2002 |
| JP | 2004-89549 A | 3/2004 |
| JP | 2007-195591 A | 8/2007 |

* cited by examiner

MOLD FOR GOLF BALLS

This application claims priority on Patent Application No. 2007-272347 and Patent Application No. 2007-272204 filed in JAPAN on Oct. 19, 2007. The entire contents of the Japanese Patent Applications are hereby incorporated by reference.

BACKGROUND OF THE INVENTION

1. Field of the Invention

The present invention relates to molds of golf balls. More particularly, the present invention relates to a mold on the cavity face of which is provided with a large number of pimples for forming dimples.

2. Description of the Related Art

Golf balls have a large number of dimples on the surface thereof. The dimples disrupt the airflow around the golf ball during its flight to cause turbulent flow separation. By causing the turbulent flow separation, separating points of the air from the golf ball shift backwards leading to the reduction of drag. The turbulent flow separation prolongs the gap between the separating point on the upper side and the separating point on the lower side of the golf ball, which results from the backspin, thereby enhancing the lift force that acts upon the golf ball. Reduction in drag and elevation of lift force are referred to as "dimple effect". Excellent dimples disrupt the air flow more efficiently.

In general, golf balls are formed using a mold having upper and lower mold halves each having a hemispherical cavity. Assuming that the upper mold half cavity is northern hemisphere of the globe and that the lower mold half cavity is southern hemisphere of the globe, the upper mold half and the lower mold half are mated on an equator face (plane including the equator). A large number of pimples are provided on the inner surface of the mold, and dimples are formed on the surface of the golf ball by means of the pimples. The dimple has a shape inverted from the shape of the pimple.

Since the molding material (for example, synthetic resin) leaks outside from a parting face of the upper mold half and the lower mold half, a flash is generated along the equator portion on the surface of the golf ball. The flash is generated along the parting line. This flash is ground and removed with a whetstone or the like. Removal of the flash generated inside the dimple is difficult. In order to facilitate the removal of the flash, any dimple is not formed on the equator. In other words, no pimple is provided on the parting face of the mold. A great circle path is formed on the seam of the golf ball obtained with this mold. The great circle path agrees with the equator. When this great circle path agrees with a part where the greatest circumferential rate of the backspin is attained (hereinafter, may be also referred to as "fastest part"), sufficient dimple effect can not be achieved. The dimple effect achieved when the great circle path agrees with the fastest part is inferior to the dimple effect achieved when the great circle path does not agree with the fastest part. The difference between these dimple effects may deteriorate aerodynamic symmetry of the golf ball. The great circle path further impairs the appearance of the golf ball.

US2002-94886 (JP2002-159598) discloses a mold provided with a parting face having a horizontal plane and an inclined plane. In this mold, pimples can be arranged on the equator except for the parting face. This mold provides a golf ball having a non-smooth seam. This golf ball does not have a great circle path. Similar mold is disclosed also in US2004/41297 (JP2004-89549).

U.S. Pat. No. 5,947,844 (JP10-99469) discloses a mold having pins placed on the parting face. The pin forms a dimple on the golf ball. By this mold, a golf ball not having a great circle path is obtained.

U.S. Pat. No. 6,123,534 (JP11-137727) discloses a mold provided with a parting face having bulges. The bulge forms a dimple on the golf ball. By this mold, a golf ball not having a great circle path is obtained.

According to the golf ball obtained with the mold provided with a parting face having a horizontal plane and an inclined plane, the dimples are sparsely provided in the vicinity of the seam. There remains room for improvement of the aerodynamic symmetry of this golf ball. Also in the case of the golf balls obtained with the mold having a pin or a bulge, their aerodynamic symmetry and appearance are still unsatisfactory.

An object of the present invention is to provide a golf ball that is excellent in aerodynamic symmetry and appearance.

SUMMARY OF THE INVENTION

The mold for a golf ball according to the present invention includes a pair of mold halves. On the cavity face of this mold is provided with a large number of pimples for forming dimples. Each mold half is provided with multiple protrusions that project from the equator. Each protrusion includes a part of the pimple. The proportion P1 of the number of the protrusion that is adjacent to other protrusion belonging to other mold half that is distinct from the mold half to which itself belongs, to the total number of the protrusions is equal to or greater than 50%. The proportion Pw of the sum total of the widths of the protrusions measured along the equator, to the entire length of the equator is equal to or greater than 35%.

Preferably, the diameter of the pimple a part of which is included in the protrusion is equal to or greater than 4.0 mm. Preferably, the number of the protrusions is 18 or greater and 33 or less. Preferably, the heights of all the protrusions from the equator are identical. Preferably, the diameters of all the pimples that are present in the region on a latitude of equal to or less than 20° are equal to or greater than 4.0 mm.

Preferably, when all the pimples that are present in the region on a latitude of equal to or less than 20° are sorted in descending order of the diameter, the ratio (Dx/Dn) of the average diameter Dx of the pimples in the top 10% and the average diameter Dn of the pimples in the bottom 10% is equal to or less than 1.15.

Preferably, the standard deviation of the diameters of all the pimples that are present in the region on a latitude of equal to or less than 20° is equal to or less than 0.15. Preferably, multiple kinds of pimples having diameters different from one another are present in the region on a latitude of equal to or less than 20°.

The method for manufacturing a golf ball according to the present invention includes the steps of placing a material into a mold that includes a pair of mold halves, on the cavity face of the mold being provided with a large number of pimples for forming dimples, wherein: each mold half is provided with multiple protrusions that project from the equator; each protrusion includes a part of the pimple; the proportion P1 of the number of the protrusion that is adjacent to other protrusion belonging to other mold half that is distinct from the mold half to which itself belongs, to the total number of the protrusions is equal to or greater than 50%; and the proportion Pw of the sum total of the widths of the protrusions measured along the equator, to the entire length of the equator is equal to or greater than 35%, and forming the dimples having a shape inverted from the shape of the pimple by allowing the material to flow in the mold.

In other aspect, there is provided a mold for a golf ball according to present invention which includes a pair of mold halves. On the cavity face of this mold is provided with a large number of pimples for forming dimples. Each mold half is provided with multiple protrusions that project from the equator. Each protrusion includes a part of the pimple. When one mold half and another mold half are mated, central angles between a protrusion and other protrusion adjacent thereto are all 10° or greater and 20° or less.

This mold includes (a) one protrusion, (b) other protrusion adjacent to the protrusion (a), and (c) still other protrusion adjacent to the protrusion (a). Preferably, the central angle θ1 between the protrusion (a) and the protrusion (b) is different from the central angle θ2 between the protrusion (a) and the protrusion (c). Preferably, the proportion P3 of the number of the protrusion (a) that forms the central angle θ1 with respect to the other protrusion (b) which is different from the central angle θ2 with respect to the still other protrusion (c), to the total number of the protrusions is equal to or greater than 50%.

Preferably, this mold includes the protrusion that is adjacent to other protrusion belonging to one mold half, and that is also adjacent to still other protrusion belonging to another mold half. Preferably, the proportion P2 of the number of the protrusion that is adjacent to other protrusion belonging to one mold half and that is also adjacent to still other protrusion belonging to another mold half, to the total number of the protrusions is equal to or greater than 50%.

Preferably, the pimple a part of which is included in the protrusion has a diameter of equal to or greater than 4.0 mm. Preferably, the number of the protrusions is 18 or greater and 33 or less. Preferably, the heights of all the protrusions from the equator are identical. Preferably, all the pimples that are present in the region on a latitude of equal to or less than 20° have a diameter of equal to or greater than 4.0 mm.

Preferably, when all the pimples that are present in the region on a latitude of equal to or less than 20° are sorted in descending order of the diameter, the ratio (Dx/Dn) of the average diameter Dx of the pimples in the top 10% and the average diameter Dn of the pimples in the bottom 10% is equal to or less than 1.15.

Preferably, the standard deviation of the diameters of all the pimples that are present in the region on a latitude of equal to or less than 20° is equal to or less than 0.15. Preferably, multiple kinds of pimples having diameters different from one another are present in the region on a latitude of equal to or less than 20°.

In another aspect, there is provided a method for manufacturing a golf ball according to the present invention which includes the steps of placing a material into a mold that includes a pair of mold halves, on the cavity face of the mold being provided with a large number of pimples for forming dimples, wherein: each mold half is provided with multiple protrusions that project from the equator; each protrusion includes a part of the pimple; and when one mold half and another mold half are mated, the central angle between one protrusion and other protrusion adjacent thereto is 10° or greater and 20° or less, and forming the dimples having a shape inverted from the shape of the pimple by allowing the material to flow in the mold.

DESCRIPTION OF THE PREFERRED EMBODIMENTS

Hereinafter, the present invention will be described in detail according to the preferred embodiments with appropriate references to the accompanying drawings.

Figure 1:
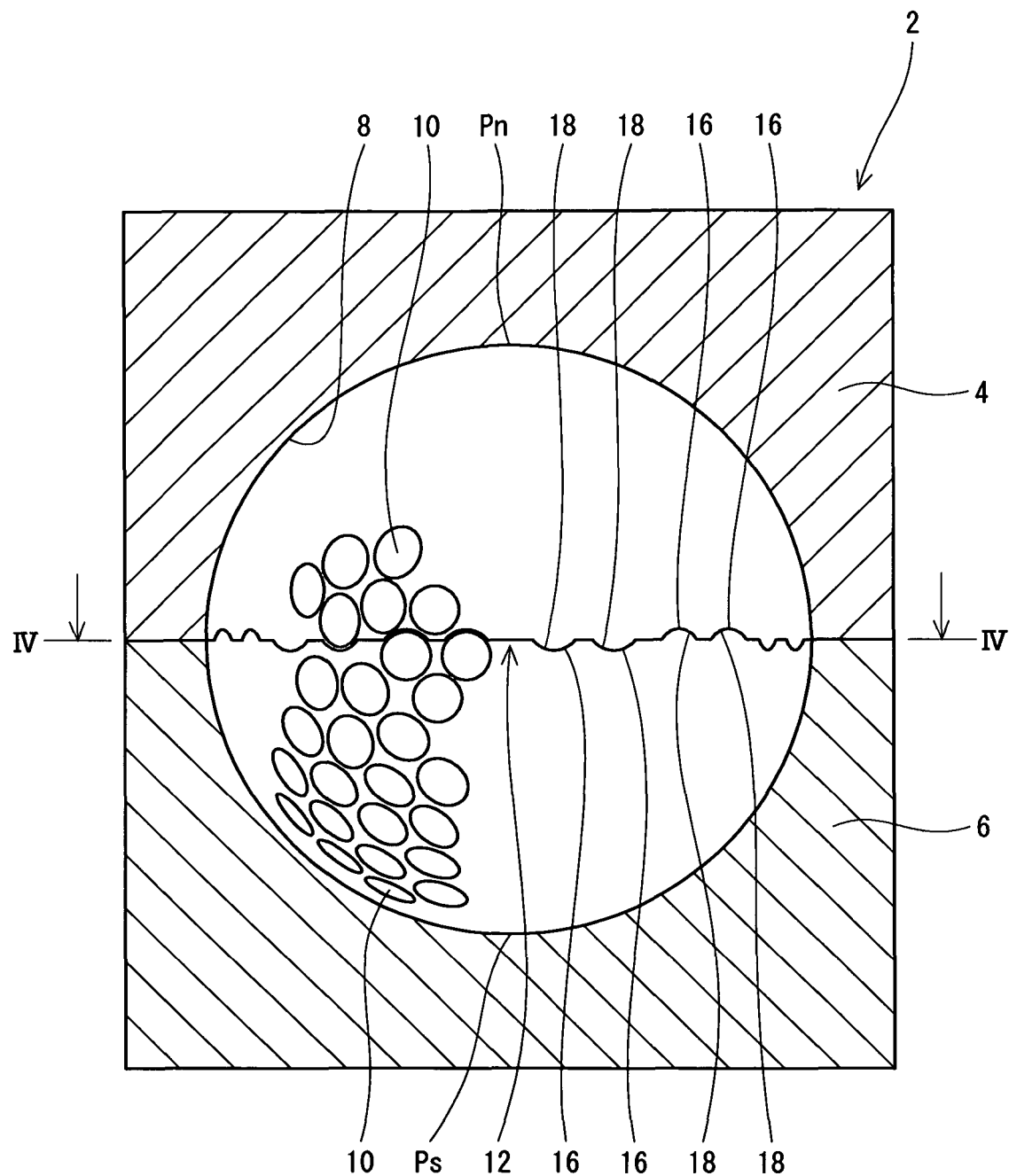
FIG. 1 shows a cross-sectional view illustrating a mold for a golf ball according to one embodiment of the present invention.
Figure 2:
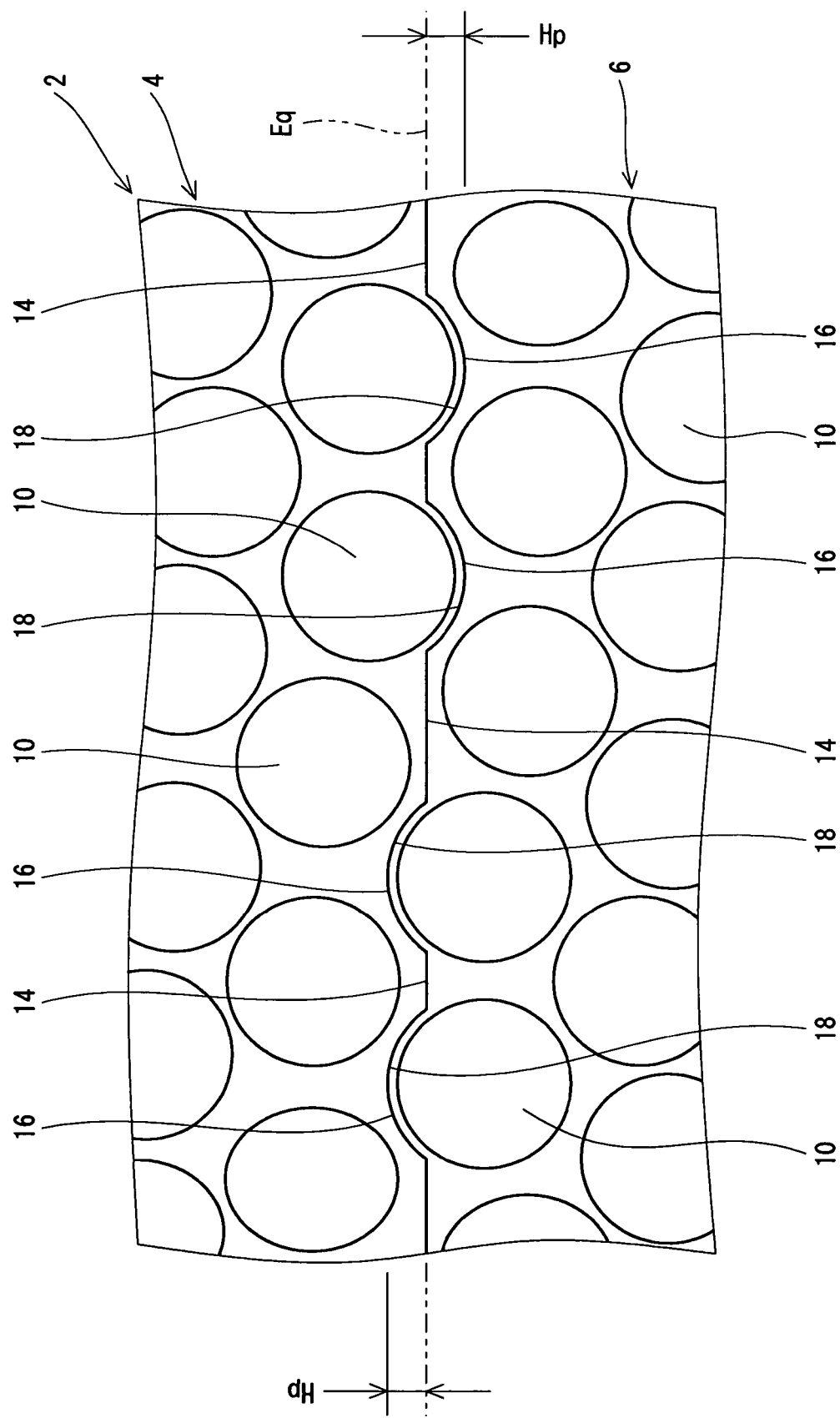
FIG. 2 shows an enlarged view illustrating a part of the mold shown in FIG. 1.

Mold 2 for a golf ball shown in FIGS. 1 and 2 includes a pair of mold halves 4 and 6. Specifically, the mold 2 includes upper mold half 4 and lower mold half 6. By mating the upper mold half 4 and the lower mold half 6, a spherical cavity is formed. A large number of pimples 10 are provided on cavity face 8 of the upper mold half 4 and the lower mold half 6. The contour of the pimple 10 has a circular shape. Although only a part of the pimples 10 are shown in FIG. 1, a large number of pimples 10 are arranged over the entire cavity face 8. As is clear from FIG. 1, parting face 12 between the upper mold half 4 and the lower mold half 6 has a non-planar shape. In FIG. 2, a chain double-dashed line indicated by reference sign Eq depicts an equator when the top of the cavity face 8 of the upper mold half 4 is assumed to be north pole Pn of a globe (see FIG. 1), while the bottom of the cavity face 8 of the lower mold half 6 is assumed to be southern pole Ps of the globe.

Figure 3:
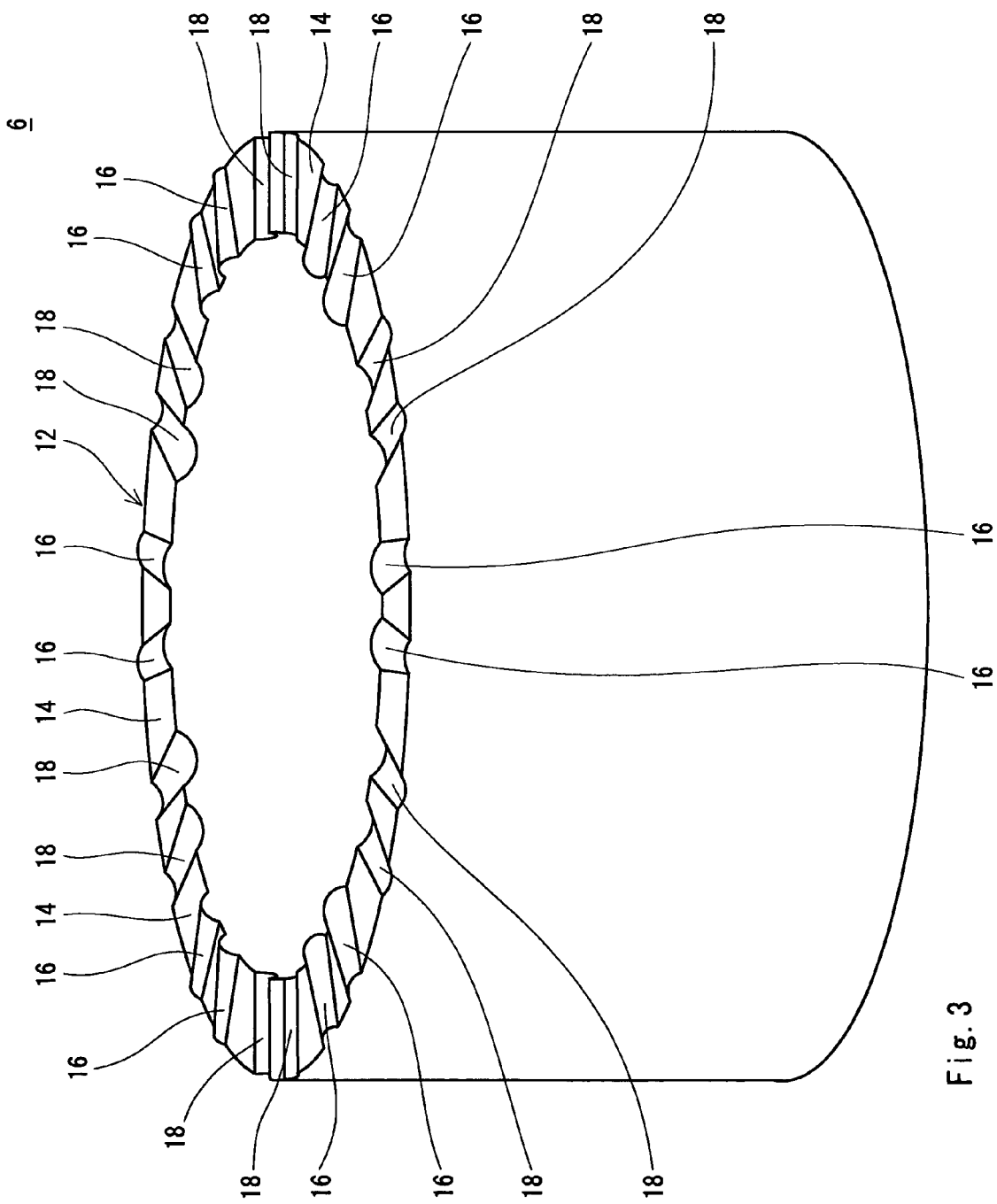
FIG. 3 shows a perspective view illustrating a lower mold half of the mold shown in FIG. 1.

FIG. 3 shows a perspective view illustrating lower mold half 6 of the mold 2 shown in FIG. 1. Parting face 12 of this lower mold half 6 has flat plane 14, protrusion 16 and recess 18. As is also shown in FIGS. 1 and 2, the flat plane 14 runs along the equator Eq. The protrusion 16 projects from the equator Eq. The recess 18 is depressed from the equator Eq. A group consisting of two protrusions 16, and a group consisting of two recesses 18 are alternately arranged along the circumferential direction. The number of the protrusions 16 is 12. The number of the recesses 18 is 12. The number of the protrusions 16 is the same as the number of the recesses 18. Although not shown in the figure, the upper mold half 4 also has a large number of protrusions 16 and a large number of recesses 18, similarly. When the upper mold half 4 is mated with the lower mold half 6, the protrusions 16 of the lower mold half 6 are fit in the recesses 18 of the upper mold half 4, while the recesses 18 of the lower mold half 6 are fit in the protrusions 16 of the upper mold half 4.

Since the protrusions 16 of the lower mold half 6 are fitted in the recesses 18 of the upper mold half 4, the number of the recesses 18 of the upper mold half 4 is the same as the number of the protrusions 16 of the lower mold half 6. Since the protrusions 16 of the upper mold half 4 are fitted in the recesses 18 of the lower mold half 6, the number of the protrusions 16 of the upper mold half 4 is the same as the number of the recesses 18 of the lower mold half 6. In this mold 2, each number of the protrusions 16 of the upper mold half 4, the recesses 18 of the upper mold half 4, the protrusions 16 of the lower mold half 6 and the recesses 18 of the lower mold half 6 is 12. This mold 2 has 24 protrusions 16 in total. This mold 2 has 24 recesses 18 in total.

As is seen from FIG. 2, the protrusion 16 includes a part of the pimple 10. The external margin of the protrusion 16 forms a circular arc. The external margin substantially agrees with the contour of the pimple 10. Since the protrusion 16 projects from the equator Eq, the pimple 10 included in the protrusion 16 intersects with the equator Eq. The center of the pimple 10 is not included in the protrusion 16.

Figure 4:
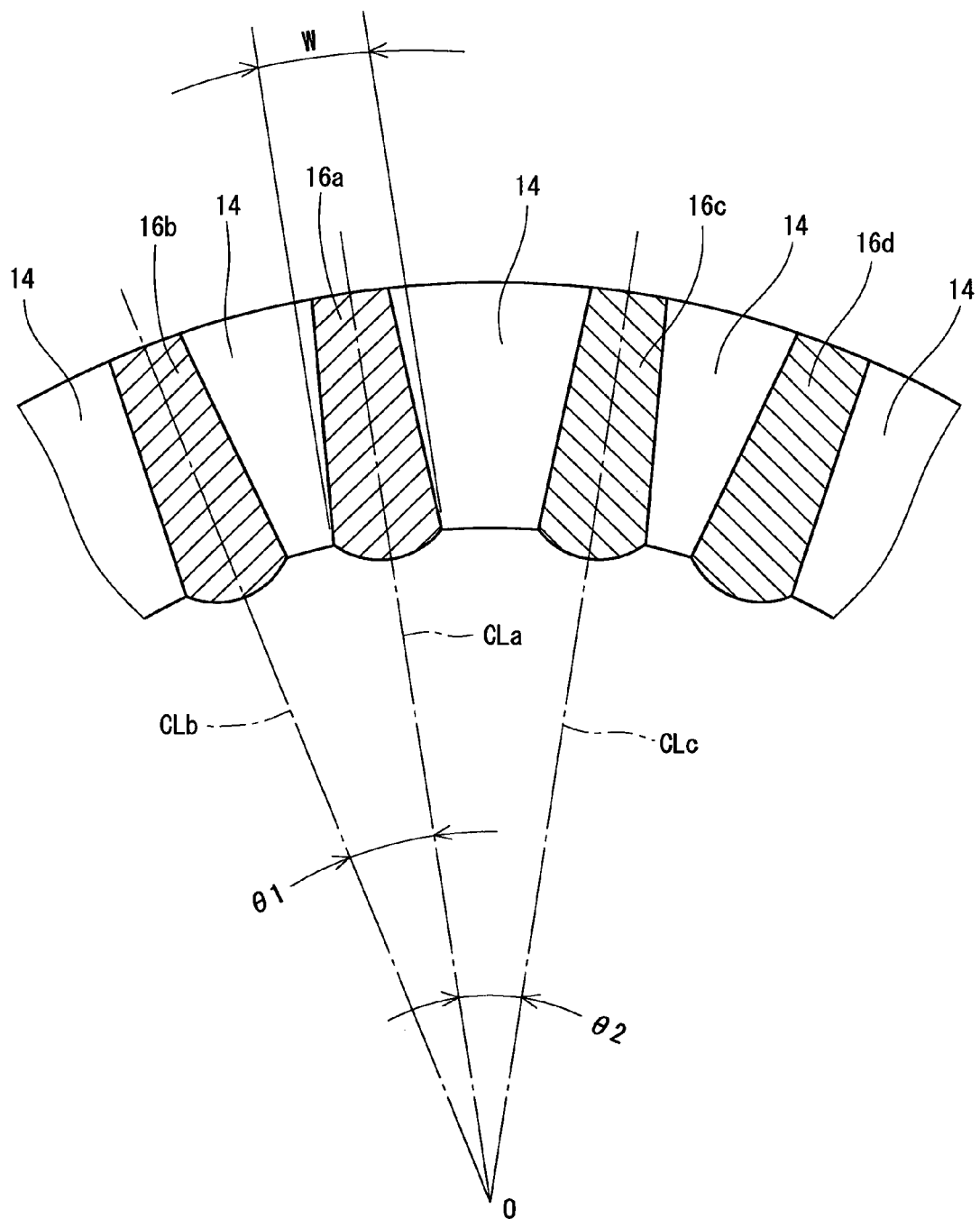
FIG. 4 shows an enlarged cross-sectional view taken along a line IV-IV of FIG. 1.

FIG. 4 shows an enlarged cross-sectional view taken along a line IV-IV of FIG. 1. This cross section is taken along the equator Eq. In FIG. 4, flat plane 14 of the lower mold half 6, two protrusions 16a and 16b of the lower mold half 6, and two protrusions 16c and 16d of the upper mold half 4 are depicted. The protrusion 16a is adjacent to the protrusion 16b. The protrusion 16a is also adjacent to the protrusion 16c. When any other protrusion is not present between two protrusions, these two protrusions are referred to be "adjacent".

In FIG. 4, what is indicated by a reference sign O is a pivot of the cavity. The center lines CLa, CLb and CLc shown in FIG. 4 pass the point O. Center line CLa passes the center in meridional direction of protrusion 16a. Center line CLb passes the center in meridional direction of protrusion 16b. Center line CLc passes the center in meridional direction of protrusion 16c. In FIG. 4, what is indicated by reference sign θ1 is the central angle between the protrusion 16a and the protrusion 16b. In FIG. 4, what is indicated by reference sign θ2 is the central angle between the protrusion 16a and the protrusion 16c.

In FIG. 4, what is indicated by arrowhead W is the width of the protrusion 16. The width W is measured along the equator Eq. In this mold 2, all the protrusions 16 have the same width W. The mold 2 may be provided with multiple kinds of protrusions 16 having different widths W one another.

This mold 2 can be used in molding of golf balls. This mold 2 can be used in compression molding, injection molding, cast molding and the like. In any of these methods, a material is placed in the mold 2. The material flows in the mold 2, whereby dimples having a shape inverted from the shape of the pimple 10 are formed.

Figure 5:
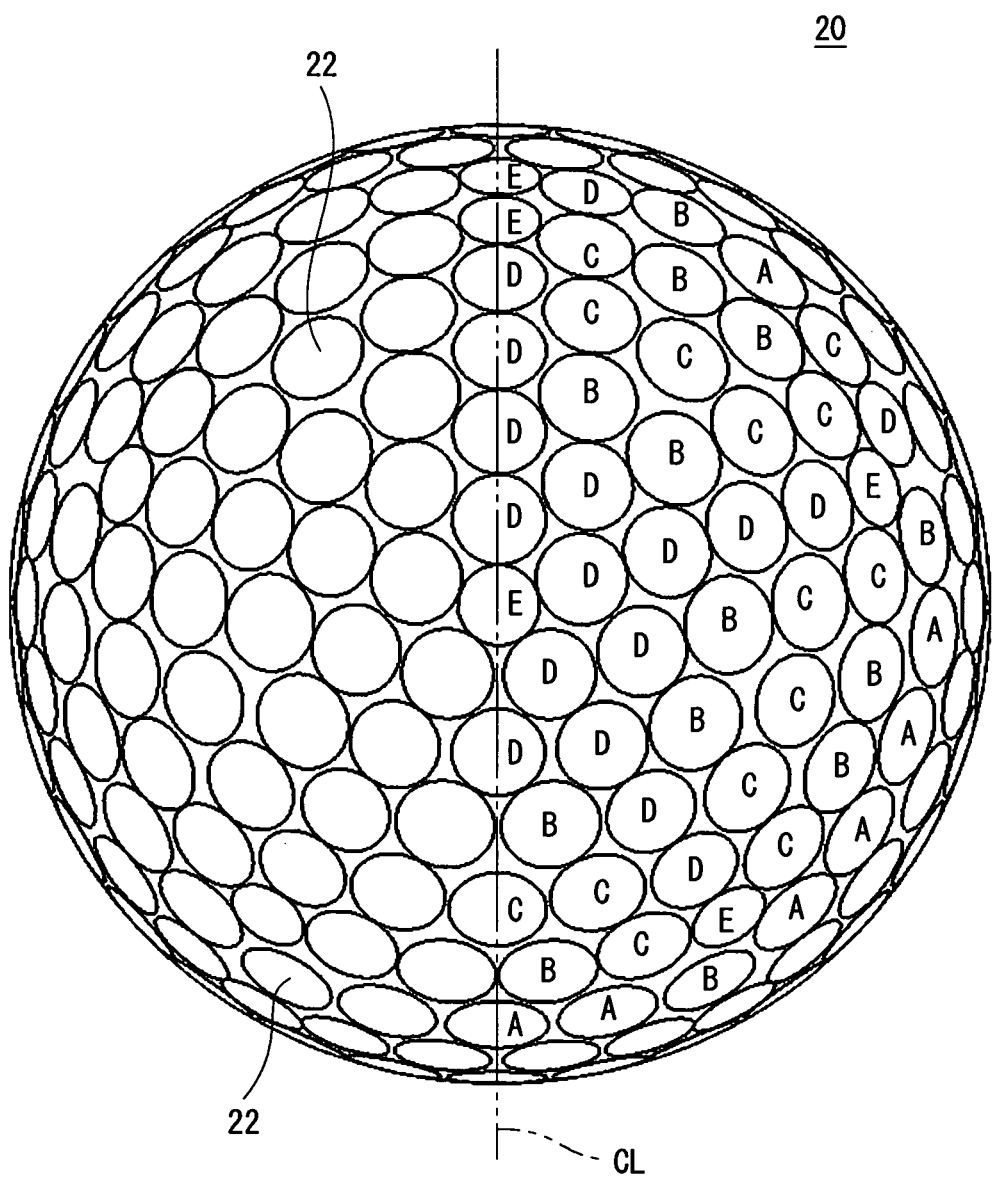
FIG. 5 shows a plan view illustrating a golf ball obtained with the mold shown in FIG. 1.
Figure 6:
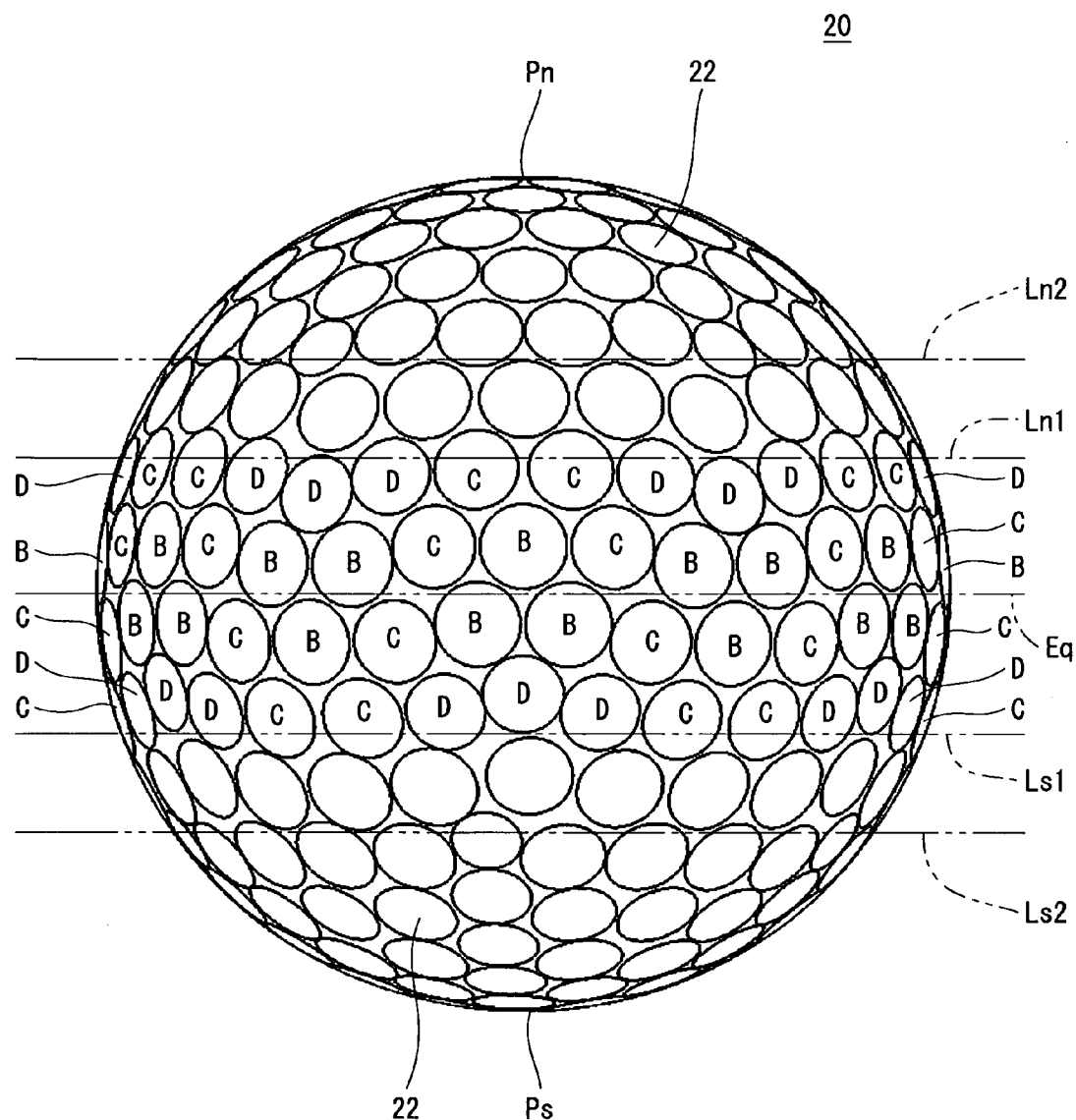
FIG. 6 shows a front view illustrating the golf ball shown in FIG. 5.

FIG. 5 shows a plan view illustrating golf ball 20 obtained with the mold 2 shown in FIG. 1, and FIG. 6 shows a front view of the same. This golf ball 20 has a large number of dimples 22 on the surface thereof. All dimples 22 are circular. In FIG. 5 and FIG. 6, types of the dimples 22 are indicated by reference signs A to E. This golf ball 20 has dimple A, dimple B, dimple C, dimple D and dimple E. The number of the dimple A is 26; the number of the dimple B is 88; the number of the dimple C is 102; the number of the dimple D is 94; and the number of dimple E is 14. Total number of the dimples 22 on this golf ball 20 is 324.

In FIG. 6, what is indicated by reference sign Ln1 is a latitude line on a north latitude of 20°, and what is indicated by reference sign Ls1 is a latitude line on a south latitude of 20°. On the surface of the golf ball 20 or on the cavity face 8, the region enclosed by latitude line Ln1 and latitude line Ls1 is a low-latitude region. On the surface of the golf ball 20 or on the cavity face 8, the region other than the low-latitude region is a high-latitude region. In FIG. 5, types of the dimples 22 being present in the high-latitude region are shown. When its center is positioned on a latitude beyond 20°, the dimple 22 corresponds to "dimple being present in the high-latitude region". In FIG. 6, types of the dimples 22 being present in the low-latitude region are shown. When its center is positioned on a latitude 20° or below 20°, the dimple 22 corresponds to "dimple being present in the low-latitude region".

The dimple 22 has a shape inverted from the shape of the pimple 10. The dimple A is formed by means of the pimple A. The dimple B is formed by means of the pimple B. The dimple C is formed by means of the pimple C. The dimple D is formed by means of the pimple D. The dimple E is formed by means of the pimple E. The mold 2 shown in FIGS. 1 to 4 have 26 pimples A, 88 pimples B, 102 pimples C, 94 pimples D and 14 pimples E. The pimple A has a diameter of 4.50 mm. The pimple B has a diameter of 4.40 mm. The pimple C has a diameter of 4.30 mm. The pimple D has a diameter of 4.10 mm. The pimple E has a diameter of 3.60 mm.

As described above, the mold 2 is provided with pimples 10 that intersect with the equator Eq. Therefore, the golf ball 20 obtained with this mold 2 has dimples 22 that intersect with the equator Eq. Any great circle path is not formed on the equator Eq of the golf ball 20. The dimple 22 that intersects with the equator Eq enhances the dimple effect when the equator Eq agrees with the fastest part of the backspin. This golf ball 20 is excellent in the aerodynamic symmetry. This golf ball 20 does not also have a great circle path that does not agree with the equator. This golf ball 20 is excellent in the appearance.

The protrusion 16a shown in FIG. 4 is adjacent to the protrusion 16c as described above. The protrusion 16a belongs to the lower mold half 6, while the protrusion 16c belongs to the upper mold half. In other words, the protrusion 16a is adjacent to the protrusion 16c belonging to one mold half (upper mold half 4) that is distinct from the mold half to which itself (protrusion 16a) belongs (lower mold half 6). On the golf ball 20 formed with this mold 2, the dimple 22 formed with the protrusion 16a belongs to the southern hemisphere, while the dimple 22 formed with the protrusion 16c belongs to the northern hemisphere.

The proportion P1 of the number of the protrusion 16 that meets the following requirement 1 to the total number of the protrusions 16 is equal to or greater than 50%.

Requirement 1: being adjacent to other protrusion 16 belonging to other mold half that is distinct from the mold half to which itself belongs.

According to the golf ball 20 formed with the mold 2 having the proportion P1 of equal to or greater than 50%, when the equator Eq agrees with the fastest part of the backspin, it is highly frequent to yield the sequence of the dimple 22 belonging to the southern hemisphere followed by the dimple 22 belonging to the northern hemisphere, while it is also highly frequent to yield the sequence of the dimple 22 belonging to the northern hemisphere followed by the dimple 22 belonging to the southern hemisphere. This golf ball 20 achieves a superior dimple effect when the equator Eq agrees with the fastest part of the backspin. This golf ball 20 is excellent in the aerodynamic symmetry. In light of the aerodynamic symmetry, the proportion P1 is more preferably equal to or greater than 60%, and particularly preferably 100%. In the mold 2 shown in FIG. 3, the proportion P1 is 100%.

As described above, the protrusion 16a is adjacent to the protrusion 16b belonging to the mold half (lower mold half 6) to which itself belongs, and is also adjacent to the protrusion 16c belonging to the mold half (upper mold half 4) that is distinct from the mold half to which itself belongs (lower mold half 6). According to the golf ball 20 obtained with this mold 2, when the fastest part is positioned to agree with the equator, the dimples 22 which emerge upon backspin sequentially belong to "southern hemisphere, southern hemisphere, northern hemisphere, northern hemisphere, southern hemisphere, southern hemisphere, northern hemisphere, northern hemisphere and so forth". Such a sequence of the dimples 22 according to this pattern serves in achieving a superior dimple effect. This golf ball 20 is excellent in the aerodynamic symmetry.

It is preferred that the proportion P2 of the number of the protrusion 16 that meets the following requirement 2 to the total number of the protrusions 16 be equal to or greater than 50%.

Requirement 2: being adjacent to other protrusion 16 belonging to one mold half to which itself belongs, and also being adjacent to still other protrusion 16 belonging to another mold half that is distinct from the mold half to which itself belongs.

The golf ball 20 obtained with the mold 2 having the proportion P2 of equal to or greater than 50% is excellent in the aerodynamic symmetry. In this respect, the proportion P2 is more preferably equal to or greater than 60%, and particularly preferably 100%. In the mold 2 shown in FIG. 1, the proportion P2 is 100%.

The proportion Pw of the sum total of widths W of all the protrusions 16 to the entire length of the equator Eq is equal to or greater than 35%. On the golf ball 20 obtained with the mold 2 having the proportion Pw of equal to or greater than 35%, the dimples 22 are densely present on the equator Eq. This golf ball 20 achieves a superior dimple effect when the equator Eq agrees with the fastest part of the backspin. This golf ball 20 is excellent in the aerodynamic symmetry. This golf ball 20 is also excellent in the appearance. In light of the aerodynamic symmetry and the appearance, the proportion Pw is more preferably equal to or greater than 46%, and particularly preferably equal to or greater than 59%. The flat plane 14 is responsible for stable mold clamping and durability of the mold 2. In this respect, the proportion Pw is preferably equal to or less than 95%, more preferably equal to or less than 90%, and particularly preferably equal to or less than 85%. In the mold 2 shown in FIG. 2, the width W is 3.3 mm, and the sum total of the widths W is 79.2 mm. Since the entire length of the equator Eq is 135.1 mm in this mold 2, the proportion Pw is 58.6%.

The central angles θ1 and θ2 of all the pimple pairs on the equator Eq are equal to or less than 20°. On the golf ball 20 obtained with the mold 2 having the central angles θ1 and θ2 being equal to or less than 20°, the dimples 22 are densely arranged on the equator Eq. This golf ball 20 is excellent in the aerodynamic symmetry and appearance. In this respect, the central angles θ1 and θ2 are preferably equal to or less than 19°, and more preferably equal to or less than 18°. In light of ease in producing the mold 2, the central angles θ1 and θ2 are preferably equal to or greater than 10°, more preferably equal to or greater than 11°, and particularly preferably equal to or greater than 12°.

By the mold 2 in which the central angle 91 is different from the central angle θ2, golf ball 20 having the dimples 22 arranged on the equator Eq at irregular intervals is obtained. This golf ball 20 achieves a superior dimple effect when the equator Eq agrees with the fastest part of the backspin. This golf ball 20 is excellent in the aerodynamic symmetry. In light of the aerodynamic symmetry, the absolute value of the difference (θ1−θ2) between the central angle θ1 and the central angle θ2 is preferably equal to or greater than 3°, and more preferably equal to or greater than 6°. The absolute value of the difference is preferably equal to or less than 10°. It is preferred that all the central angles θ1 be the same. Also, it is preferred that all the central angles θ2 be the same.

It is preferred that the proportion P3 of the number of the protrusion 16 that meets the following requirement 3 to the total number of the protrusions 16 be equal to or greater than 50%.

Requirement 3: the central angle θ1 with respect to one adjacent protrusion 16 being different from the central angle θ2 with respect to another adjacent protrusion 16.

The golf ball 20 obtained with the mold 2 having the proportion P3 of equal to or greater than 50% is excellent in the aerodynamic symmetry. In this respect, the proportion P3 is more preferably equal to or greater than 60%, and particularly preferably 100%. In the mold 2 shown in FIG. 1, the proportion P3 is 100%.

The proportion P4 of the number of the protrusion 16 that meets both the aforementioned requirements 2 and 3 to the total number of the protrusions 16 is preferably equal to or greater than 50%. The golf ball 20 obtained with the mold 2 having the proportion P4 of equal to or greater than 50% is excellent in the aerodynamic symmetry. In this respect, the proportion P4 is more preferably equal to or greater than 60%, and particularly preferably 100%. In the mold 2 shown in FIG. 1, the proportion P4 is 100%.

As is apparent from FIG. 6, a large number of dimples B intersect with the equator Eq of the golf ball 20. The dimple B has a large diameter. The golf ball 20 on which the dimples 22 having a large diameter intersect with the equator Eq achieves a superior dimple effect when the equator Eq agrees with the fastest part of the backspin. This golf ball 20 is excellent in the aerodynamic symmetry. In light of the aerodynamic symmetry, the pimple 10 that intersects with the equator Eq has a diameter of preferably equal to or greater than 4.0 mm, more preferably equal to or greater than 4.2 mm, and particularly preferably equal to or greater than 4.4 mm. In light of avoidance from remarkable deformation of the dimple 22 due to removal of the flash, the pimple 10 that intersects with the equator Eq has a diameter of preferably equal to or less than 5.0 mm. It is preferred that all the pimples 10 that intersect with the equator Eq have a diameter falling within the above range.

In light of the aerodynamic symmetry, all the pimples 10 that are present in the low-latitude region have a diameter of equal to or greater than 4.0 mm, and more preferably equal to or greater than 4.1 mm. On the golf ball 20 shown in FIG. 6, dimple B, dimple C and dimple D are present in the low-latitude region. All the pimples 10 that are present in the low-latitude region of this mold 2 have a diameter of equal to or greater than 4.1 mm.

The golf ball 20 on which a large number of dimples 22 intersect with the equator Eq is excellent in the aerodynamic symmetry. In this respect, the number of the pimples 10 that intersect with the equator Eq is preferably equal to or greater than 18, more preferably equal to or greater than 20, and particularly preferably equal to or greater than 24. Due to possibility of arrangement of large dimples 22 on the equator Eq, the number of the pimples 10 that intersect with the equator Eq is preferably equal to or less than 33, and more preferably equal to or less than 30. In the mold 2 shown in FIG. 1, the number of the pimples 10 that intersect with the equator Eq is 24. Therefore, on the golf ball 20 shown in FIG. 6, the number of the dimples 22 that intersect with the equator Eq is 24.

It is preferred that the dimples 22 be densely arranged in the low-latitude region on the golf ball 20. This golf ball 20 achieves a superior dimple effect when the equator Eq agrees with the fastest part of the backspin. This golf ball 20 is excellent in the aerodynamic symmetry. This golf ball 20 is also excellent in the appearance. Arrangement of multiple kinds of the pimples 10 having diameters different from one another in the low-latitude region of the mold 2 enables achievement of high density of the dimples 22 in the low-latitude region. In light of the aerodynamic symmetry and the appearance, the number of the kinds of the pimples 10 that are present in the low-latitude region is preferably equal to or greater than 2, and more preferably equal to or greater than 3. In light of ease in producing the mold 2, the number of the kinds is preferably equal to or less than 10. In the mold 2 shown in FIG. 1, pimple B, pimple C and pimple D are present in the low-latitude region. The number of the kinds of the pimples 10 is three in the low-latitude region of the mold 2.

When all the pimples 10 that are present in the low-latitude region are sorted in descending order of the diameter, the ratio (Dx1/Dn1) of the average diameter Dx1 of the pimples 10 in the top 10% and the average diameter Dn1 of the pimples 10 in the bottom 10% is preferably equal to or less than 1.15. The golf ball 20 obtained with this mold 2 achieves a superior dimple effect when the equator Eq agrees with the fastest part of the backspin. This golf ball 20 is excellent in the aerodynamic symmetry. In light of the aerodynamic symmetry, the ratio (Dx1/Dn1) is more preferably equal to or less than 1.10, and particularly preferably equal to or less than 1.07. The low-latitude region of the mold 2 shown in FIG. 1 has 36 pimples B, 48 pimples C and 36 pimples D. The number of the dimples 22 in the low-latitude region is 120. Therefore, 12 pimples B correspond to the pimples 10 in the top 10%, and 12 pimples D correspond to the pimples 10 in the bottom 10%. In this mold 2, Dx1 is 4.40 mm, while Dn1 is 4.10 mm. Accordingly, the ratio (Dx1/Dn1) is 1.07.

When all the pimples 10 are sorted in descending order of the diameter, the ratio (Dx2/Dn2) of the average diameter Dx2 of the pimples 10 in the top 10% and the average diameter Dn2 of the pimples 10 in the bottom 10% is preferably equal to or less than 1.30. The golf ball 20 obtained with the mold 2 having the ratio (Dx2/Dn2) of equal to or less than 1.30 is excellent in the flight performance. In light of the flight performance, the ratio (Dx2/Dn2) is preferably equal to or less than 1.20, and more preferably equal to or less than 1.16. The ratio (Dx2/Dn2) of the mold 2 shown in FIG. 1 is 1.16.

The standard deviation Σ1 of the diameters of all the pimples 10 that are present in the low-latitude region is preferably equal to or less than 0.15. The golf ball 20 obtained with this mold 2 achieves a superior dimple effect when the equator Eq agrees with the fastest part of the backspin. This golf ball 20 is excellent in the aerodynamic symmetry. In light of the aerodynamic symmetry, the standard deviation Σ1 is more preferably equal to or less than 0.12. In the low-latitude region of the mold 2 shown in FIG. 1, the average diameter of the pimples 10 is 4.27 mm. Therefore, the standard deviation Σ1 is calculated by the following formula:

$$\Sigma 1 = (((4.40-4.27)^2 \times 36 + (4.30-4.27)^2 \times 48 + (4.10-4.27)^2 \times 36)/120)^{1/2}$$

In this golf ball 20, the standard deviation Σ1 is 0.12.

The standard deviation Σ2 of the diameters of all the pimples 10 is preferably equal to or less than 0.30. The golf ball 20 obtained with the mold 2 in which the standard deviation Σ2 is equal to or less than 0.30 is excellent in the flight performance. In light of the flight performance, the standard deviation Σ2 is more preferably equal to or less than 0.25, and particularly preferably equal to or less than 0.20. The standard deviation Σ2 of the mold 2 shown in FIG. 1 is 0.20.

In FIG. 2, what is indicated by arrowhead Hp is the height of the protrusion 16 from the equator Eq. In light of superior dimple effect achieved when the equator Eq agrees with the fastest part of the backspin, the height Hp is preferably equal to or greater than 0.2 mm, more preferably equal to or greater than 0.3 mm, and particularly preferably equal to or greater than 0.4 mm. In light of the durability of the mold 2, the height Hp is preferably equal to or less than 1.5 mm, and more preferably equal to or less than 1.3 mm.

The width of the intersection of the dimple 22 with the equator Eq is nearly the same as the height of the Hp of the protrusion 16. In light of the dimple effect, the width of the intersection is preferably equal to or greater than 0.2 mm, more preferably equal to or greater than 0.3 mm, and particularly preferably equal to or greater than 0.4 mm. In light of ease in manufacturing the golf ball 20, the width of the intersection is preferably equal to or less than 1.5 mm, and more preferably equal to or less than 1.3 mm.

In light of the ease in manufacturing the golf ball 20 and the durability of the mold 2, the absolute value of the difference (Hp1−Hp2) between the height Hp1 of the highest protrusion 16 and the height Hp2 of the lowest protrusion 16 is preferably equal to or less than 0.5 mm. Ideally, the difference (Hp1−Hp2) is zero. In other words, it is preferred that the heights of all the protrusions 16 from the equator Eq be the same.

In FIG. 6, what are indicated by reference signs Ln2 and Ls2 are latitude lines. The latitude of the latitude lines Ln2 and Ls2 may be determined ad libitum in the range of beyond 20° and 40° or lower. On the surface of the golf ball 20, the region between the latitude line Ln2 and the pole point Pn is herein referred to as pole vicinity region. On the surface of the golf ball 20, the region between the latitude line Ls2 and the pole point Ps is also referred to as pole vicinity region. As is apparent from FIG. 5, the pattern of the dimples 22 the center of which belongs to the pole vicinity region can be comparted into five units. The dimple pattern in each unit is substantially the same. When the dimple pattern in one unit is rotated 72° around the pole point as a center, it substantially overlaps with the dimple pattern of another unit. The symmetric rotation angle of the dimple pattern in the pole vicinity region is 72°.

The pattern of the dimples 22 belonging to the low-latitude region can be comparted into six units. The dimple pattern in each unit is substantially the same. When the dimple pattern in one unit is rotated 60° around the pole point as a center, it substantially overlaps with the dimple pattern of another unit. The symmetric rotation angle of the dimple pattern in the low-latitude region is 60°. This symmetric rotation angle is different from the symmetric rotation angle of the dimple pattern in the pole vicinity region (i.e., 72°). Due to the difference in symmetric rotation angles, this golf ball 20 achieves a superior dimple effect. This golf ball 20 is excellent in the flight performance.

In FIG. 6, the region enclosed by the latitude line Ln1 and latitude line Ln2 is a coordination region. The region enclosed by the latitude line Ls1 and the latitude line Ls2 is also a coordination region. The pattern of the dimples 22 belonging to the coordination region has a line symmetry with respect to the center line CL shown in FIG. 5 in a plan view. This dimple pattern does not have any axis of symmetry other than the center line CL. In this dimple pattern, rotation of 0° or greater and less than 360° around the pole point as a center does not generate overlap of the dimple patterns with one another. In other words, the dimple pattern in the coordination region cannot be comparted into multiple units that are rotationally symmetric each other. The dimple pattern in the coordination region which can be comparted into multiple units that are rotationally symmetric is also acceptable. In this instance, the number of the units in the coordination region must be different from the number of the units in the pole vicinity region, and further, must be also different from the number of the units in the low-latitude region.

Provided that the pole vicinity region is adjacent to the low-latitude region across the boundary line, the dimples 22 cannot be arranged densely in the vicinity of this boundary line resulting from the difference in the numbers of the units. In this case, a large land shall be present in the vicinity of the boundary line. The large land may inhibit the dimple effect. In the golf ball 20 according to the present invention, the coordination region is present between the pole vicinity region and the low-latitude region. In this coordination region, the dimples 22 can be arranged without being bound by the number of the units. Thus, the area of the land can be diminished. Owing to this coordination region, high occupation ratio of the dimples 22 can be achieved.

In this golf ball 20, the symmetric rotation angle of the pattern of the dimples 22 that intersect with the equator Eq is 60°. This symmetric rotation angle is different from the symmetric rotation angle of the dimple pattern in the pole vicinity region (i.e., 72°). This golf ball 20 achieves a superior dimple effect when the equator Eq agrees with the fastest part of the backspin. This golf ball 20 is excellent in the aerodynamic symmetry.

In this golf ball 20, the symmetric rotation angle of the pattern of the dimples 22 that intersect with the equator Eq is 60°. Furthermore, the symmetric rotation angle of the pattern of the dimples 22 that belong to the low-latitude region and do not intersect with the equator Eq is also 60° in this golf ball 20. Both symmetric rotation angles are identical. High occupancy rate of the dimples 22 is achieved in the low-latitude region according to this golf ball 20. This golf ball 20 achieves a superior dimple effect when the equator Eq agrees with the fastest part of the backspin. This golf ball 20 is excellent in the aerodynamic symmetry.

According to the present invention, the rate of sum total of the area of all the dimples 22 to the surface area of the phantom sphere of the golf ball 20 is referred to as an occupation rate. From the standpoint that a sufficient dimple effect is achieved, the occupation rate is preferably equal to or greater than 75%, more preferably equal to or greater than 76%, and particularly preferably equal to or greater than 77%. The occupancy rate is preferably equal to or less than 86%, more preferably equal to or less than 85%, and particularly preferably equal to or less than 84%.

According to the present invention, the term "dimple volume" means a volume of a part surrounded by a plane that includes the contour of the dimple 22, and the surface of the dimple 22. In light of suppression of hopping of the golf ball 20, the total volume of the dimples 22 is preferably equal to or greater than 250 mm$^3$, more preferably equal to or greater than 260 mm$^3$, and particularly preferably equal to or greater than 270 mm$^3$. In light of suppression of dropping of the golf ball 20, the total volume is preferably equal to or less than 400 mm$^3$, more preferably equal to or less than 390 mm$^3$, and particularly preferably equal to or less than 380 mm$^3$.

In light of suppression of hopping of the golf ball 20, the depth of the dimple 22 is preferably equal to or greater than 0.05 mm, more preferably equal to or greater than 0.08 mm, and particularly preferably equal to or greater than 0.10 mm. In light of suppression of dropping of the golf ball 20, the depth is preferably equal to or less than 0.60 mm, more preferably equal to or less than 0.45 mm, and particularly preferably equal to or less than 0.40 mm.

The diameter of the dimple 22 is preferably 2.00 mm or greater and 6.00 mm or less. By setting the diameter to be equal to or greater than 2.00 mm, a superior dimple effect can be achieved. In this respect, the diameter is more preferably equal to or greater than 2.20 mm, and particularly preferably equal to or greater than 2.40 mm. By setting the diameter to be equal to or less than 6.00 mm, fundamental feature of the golf ball 20 which is substantially a sphere can be maintained. In this respect, the diameter is more preferably equal to or less than 5.80 mm, and particularly preferably equal to or less than 5.60 mm.

In light of achievement of sufficient dimple effect, total number of the dimples 22 is preferably equal to or greater than 250, and particularly preferably equal to or greater than 270. In light of the possibility that respective dimples 22 can have a sufficient diameter, the total number is preferably equal to or less than 400, and particularly preferably equal to or less than 370.

EXAMPLES

Sample 1

A rubber composition was obtained by kneading 100 parts by weight of polybutadiene (trade name "BR-730", available from JSR Corporation), 30 parts by weight of zinc diacrylate, 6 parts by weight of zinc oxide, 10 parts by weight of barium sulfate, 0.5 parts by weight of diphenyl disulfide and 0.5 parts by weight of dicumyl peroxide. This rubber composition was placed into a mold having upper and lower mold halves each having a hemispherical cavity, and heated at 170° C. for 18 minutes to obtain a core having a diameter of 39.7 mm. On the other hand, 50 parts by weight of an ionomer resin (available from Du Pont-MITSUI POLYCHEMICALS Co., Ltd.; trade name "Himilan® 1605"), 50 parts by weight of other ionomer resin (available from Du Pont-MITSUI POLYCHEMICALS Co., Ltd.; trade name "Himilan® 1706") and 3 parts by weight of titanium dioxide were kneaded to obtain a resin composition. Half shells were formed with this resin composition. The aforementioned core was covered by two half shells, and the core with the half shells was placed in the mold shown in FIG. 1. Specifications of the pimples of the mold are presented in Table 1 below. The half shells were compressed and heated in this mold to form a cover having a thickness of 1.5 mm. A large number of dimples having a shape inverted from the shape of the pimple were formed on the cover. The flash generated along the seam was removed by grinding. A clear paint including a two-part liquid curable polyurethane as a base was applied on the cover to give a golf ball having a diameter of 42.7 mm and a weight of 45.4 g. This golf ball had a PGA compression of about 85. This golf ball has a dimple pattern shown in FIG. 5 and FIG. 6.

Samples 2 to 7

Golf balls were obtained in a similar manner to Sample 1 except that the mold with the specifications presented in the following Tables 1 and 2 was used.

Travel Distance Test

A driver with a titanium head (trade name "XXIO", available from Sumitomo Rubber Industries, Ltd., shaft hardness: X, loft angle: 9°) was attached to a swing machine, available from Golf Lab Co., Ltd. Then the golf ball was hit under the condition to provide a head speed of 49 m/sec, a launch angle being about 11° and give the backspin rate of about 3000 rpm. Accordingly, the distance from the launching point to the point where the ball stopped was measured. Under the condition during the test, it was almost windless. Twenty times measurements were carried out with pole shot and seam shot, respectively. Mean values of the travel distance are presented in Table 2 below. The rotation axis of the seam shot passes both pole points. The rotation axis of the pole shot is perpendicular to the rotation axis of the seam shot.

Appearance

The appearance of the golf ball was visually observed. The grading was made based on the following criteria:

A: appearance being favorable,
B: appearance being somewhat unfavorable, and
C: appearance being unfavorable.

The results are presented in Table 3 below.

TABLE 1

Specifications of pimples

| | Kind | Number | Diameter (mm) | Depth (mm) | Volume (mm$^3$) | Number (intersecting with equator) | Number (low-latitude region) |
|---|---|---|---|---|---|---|---|
| Sample 1 | A | 26 | 4.50 | 0.142 | 1.131 | 0 | 0 |
| | B | 88 | 4.40 | 0.142 | 1.081 | 24 | 36 |
| | C | 102 | 4.30 | 0.142 | 1.033 | 0 | 48 |
| | D | 94 | 4.10 | 0.142 | 0.939 | 0 | 36 |
| | E | 14 | 3.60 | 0.142 | 0.724 | 0 | 0 |
| Sample 2 | A | 60 | 4.60 | 0.144 | 1.198 | 24 | 42 |
| | B | 42 | 4.40 | 0.144 | 1.096 | 0 | 24 |
| | C | 12 | 4.30 | 0.144 | 1.047 | 0 | 12 |
| | D | 66 | 4.20 | 0.144 | 0.999 | 0 | 12 |
| | E | 126 | 4.00 | 0.144 | 0.906 | 0 | 12 |
| | F | 12 | 3.90 | 0.144 | 0.862 | 0 | 0 |
| | G | 12 | 2.60 | 0.144 | 0.384 | 0 | 0 |
| Sample 3 | A | 26 | 4.50 | 0.142 | 1.131 | 0 | 0 |
| | B | 64 | 4.40 | 0.142 | 1.081 | 0 | 12 |
| | C | 102 | 4.30 | 0.142 | 1.033 | 0 | 48 |
| | D | 94 | 4.10 | 0.142 | 0.939 | 0 | 36 |
| | F | 24 | 3.90 | 0.142 | 0.850 | 24 | 24 |
| | E | 14 | 3.60 | 0.142 | 0.724 | 0 | 0 |
| Sample 4 | A | 26 | 4.50 | 0.142 | 1.131 | 0 | 0 |
| | B | 88 | 4.40 | 0.142 | 1.081 | 24 | 36 |
| | C | 78 | 4.30 | 0.142 | 1.033 | 0 | 24 |
| | D | 94 | 4.10 | 0.142 | 0.939 | 0 | 36 |
| | F | 24 | 3.90 | 0.142 | 0.850 | 0 | 24 |
| | E | 14 | 3.60 | 0.142 | 0.724 | 0 | 0 |

TABLE 2

Specifications of pimples

| | Kind | Number | Diameter (mm) | Depth (mm) | Volume (mm$^3$) | Number (intersecting with equator) | Number (low-latitude region) |
|---|---|---|---|---|---|---|---|
| Sample 5 | A | 26 | 4.50 | 0.142 | 1.131 | 0 | 0 |
| | B | 76 | 4.40 | 0.142 | 1.081 | 12 | 24 |
| | C | 102 | 4.30 | 0.142 | 1.033 | 0 | 48 |
| | D | 94 | 4.10 | 0.142 | 0.939 | 0 | 36 |
| | F | 12 | 3.90 | 0.142 | 0.850 | 0 | 12 |
| | E | 14 | 3.60 | 0.142 | 0.724 | 0 | 0 |
| Sample 6 | A | 60 | 4.60 | 0.144 | 1.198 | 18 | 42 |
| | B | 42 | 4.40 | 0.144 | 1.096 | 0 | 24 |
| | C | 12 | 4.30 | 0.144 | 1.047 | 0 | 12 |
| | D | 66 | 4.20 | 0.144 | 0.999 | 0 | 12 |
| | E | 126 | 4.00 | 0.144 | 0.906 | 0 | 12 |
| | F | 12 | 3.90 | 0.144 | 0.862 | 0 | 0 |
| | G | 12 | 2.60 | 0.144 | 0.384 | 0 | 0 |
| Sample 7 | A | 80 | 4.55 | 0.139 | 1.131 | 0 | 0 |
| | B | 80 | 4.45 | 0.139 | 1.082 | 0 | 36 |
| | C | 60 | 4.25 | 0.139 | 0.987 | 0 | 60 |
| | D | 40 | 4.10 | 0.139 | 0.919 | 0 | 0 |
| | E | 56 | 3.85 | 0.139 | 0.810 | 0 | 24 |
| | F | 14 | 3.00 | 0.139 | 0.493 | 0 | 0 |

TABLE 3

Figure 7:
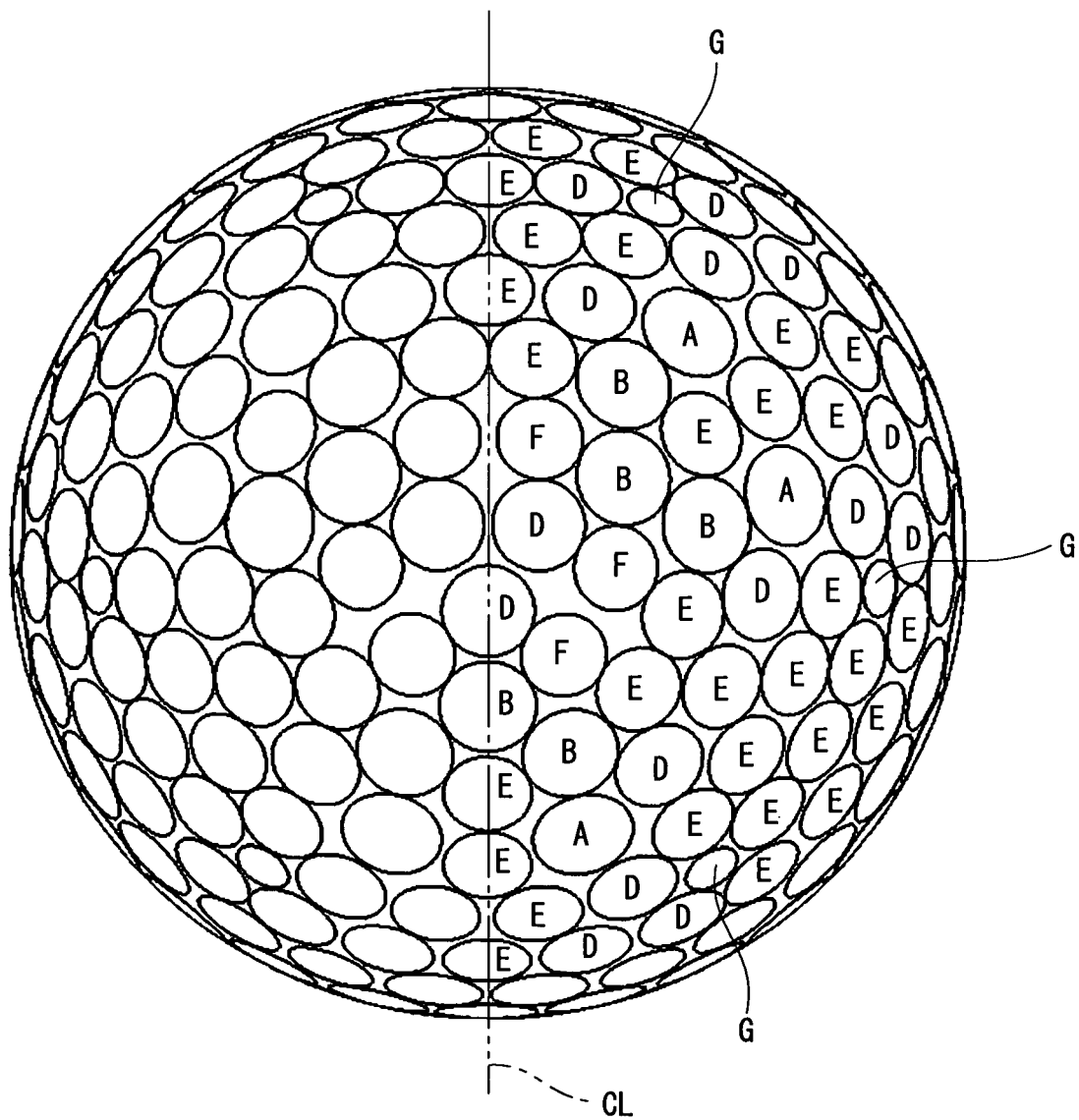
FIG. 7 shows a plan view illustrating a golf ball obtained with a mold according to Sample 2 of the present invention.
Figure 8:
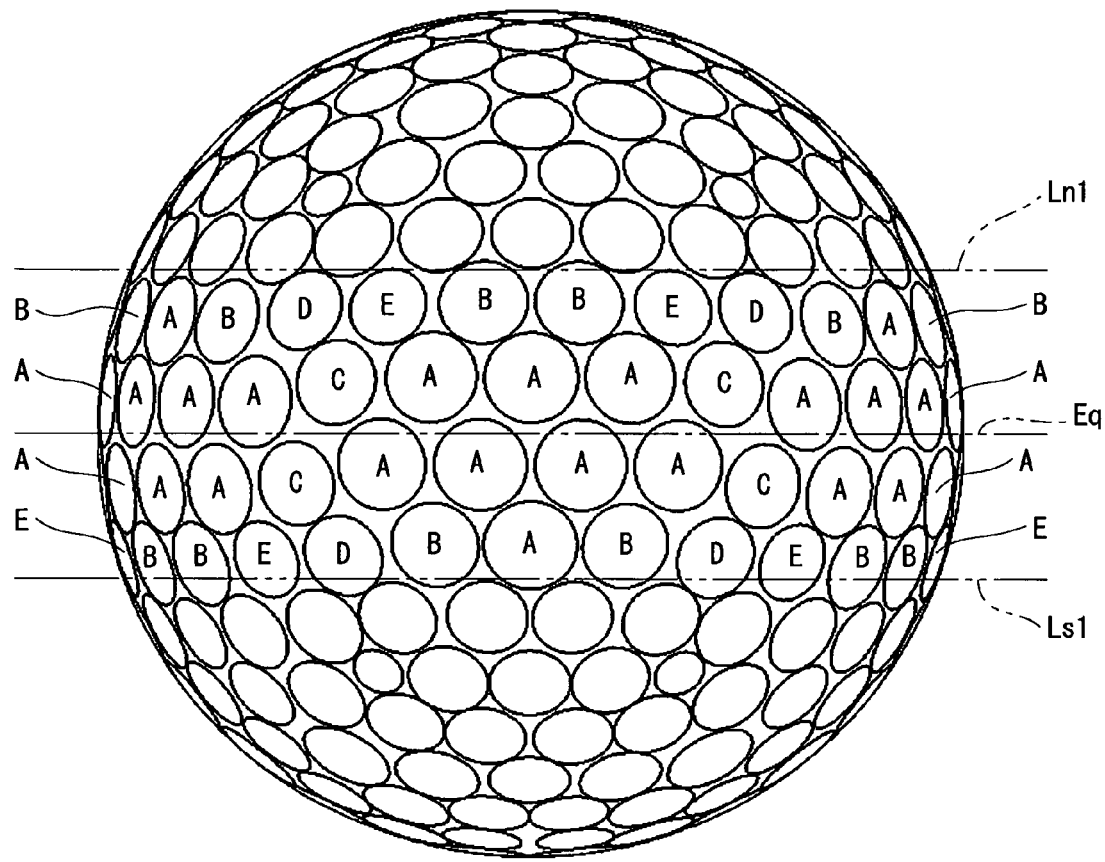
FIG. 8 shows a front view illustrating the golf ball shown in FIG. 7.
Figure 9:
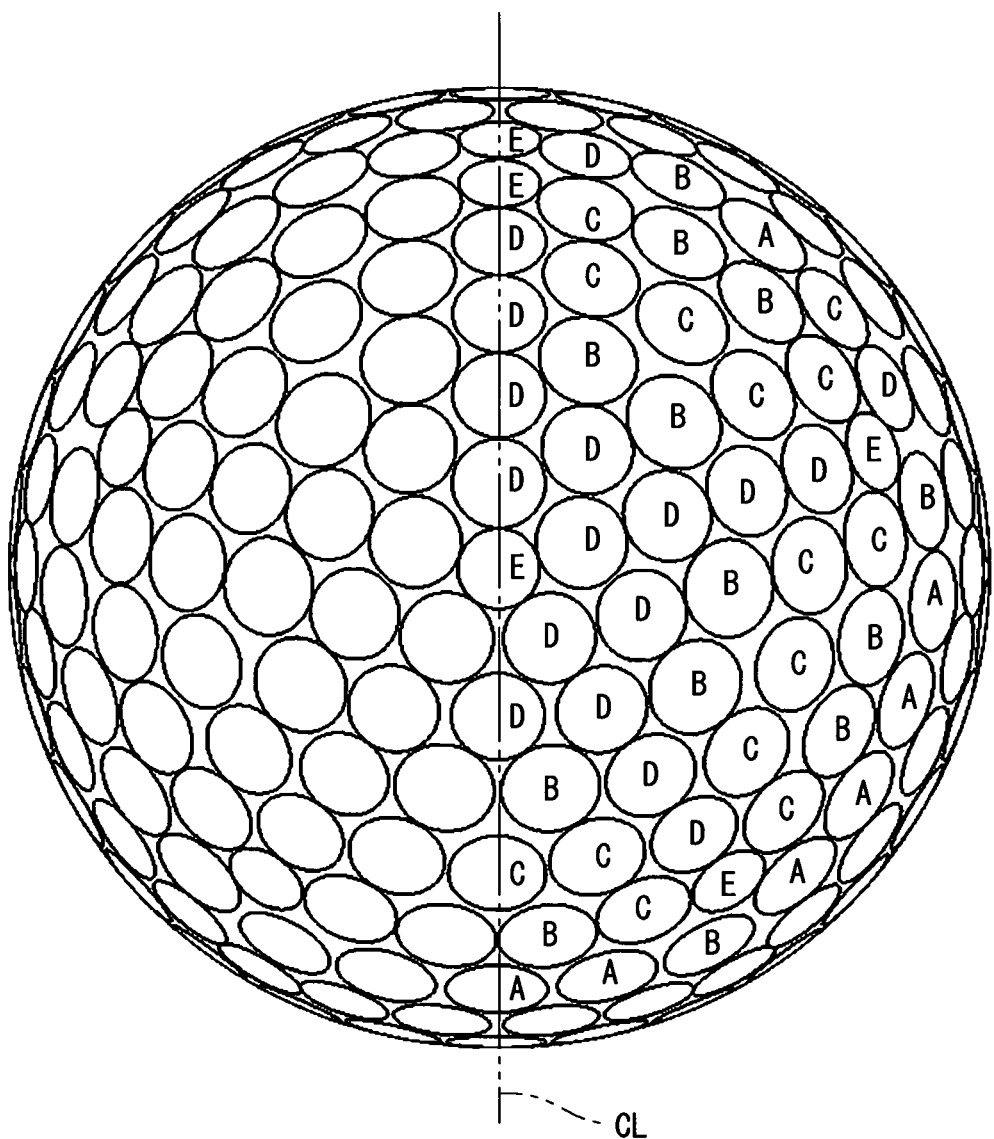
FIG. 9 shows a plan view illustrating a golf ball obtained with a mold according to Sample 3.
Figure 10:
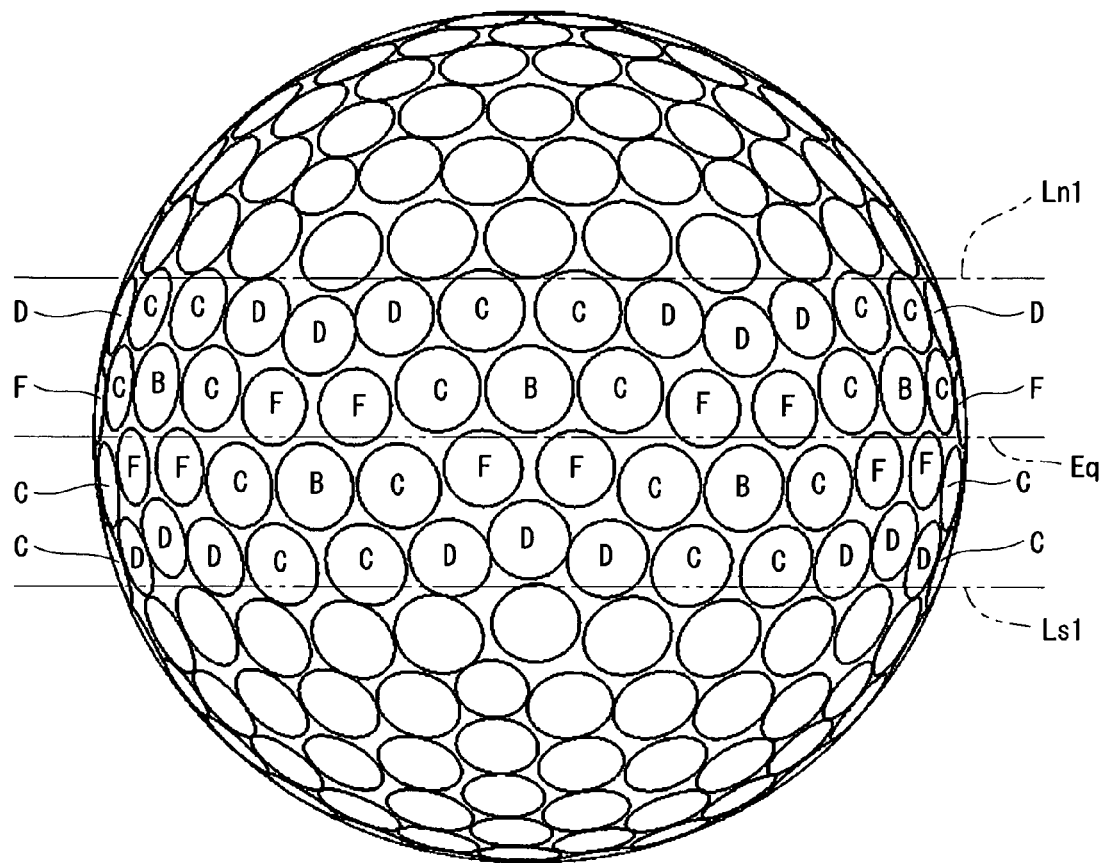
FIG. 10 shows a front view illustrating the golf ball shown in FIG. 9.
Figure 11:
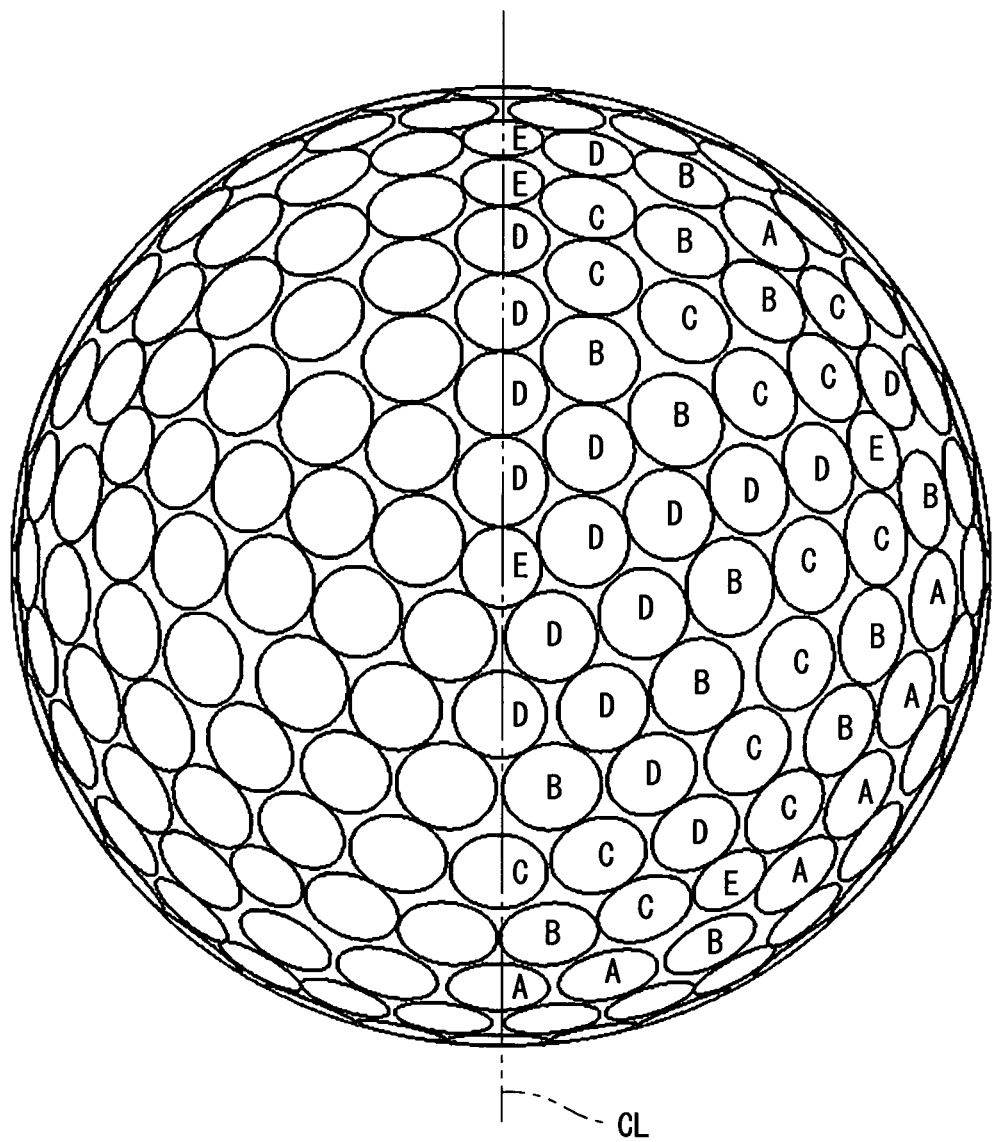
FIG. 11 shows a plan view illustrating a golf ball obtained with a mold according to Sample 4.
Figure 12:
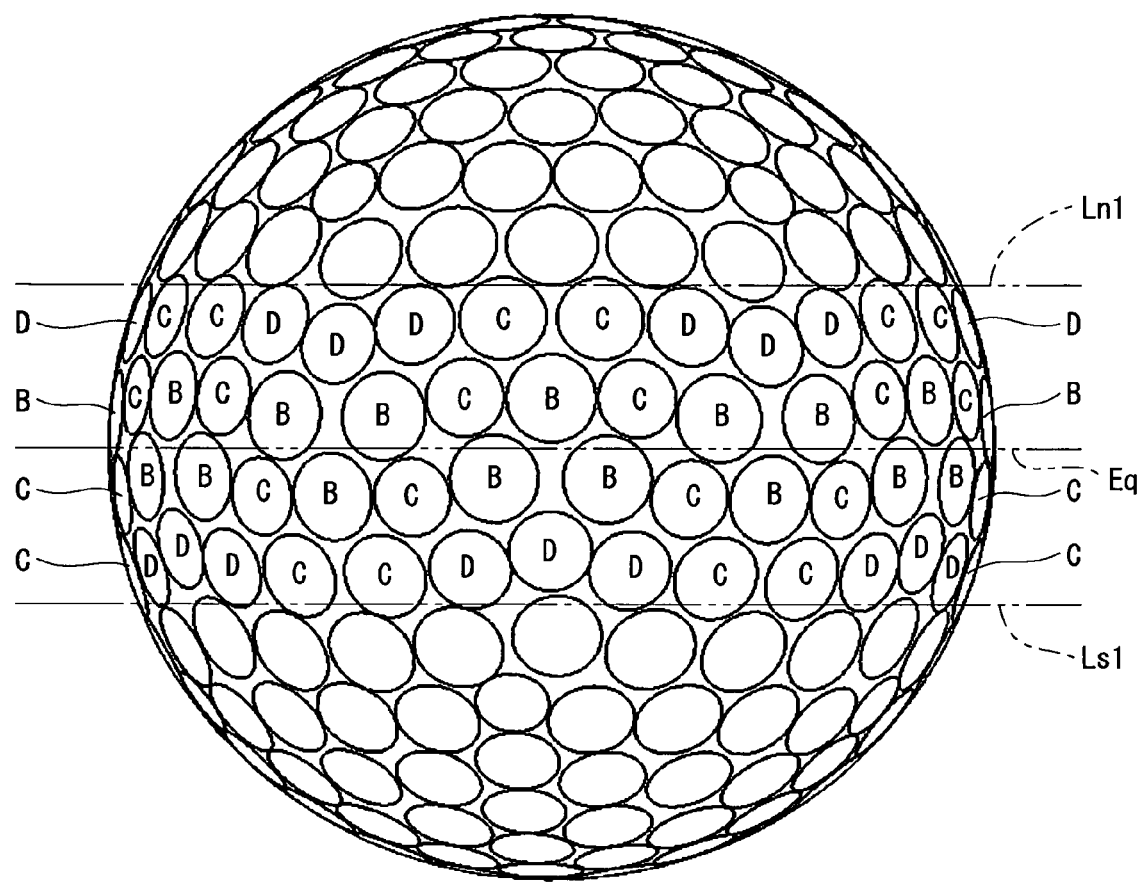
FIG. 12 shows a front view illustrating the golf ball shown in FIG. 11.
Figure 13:
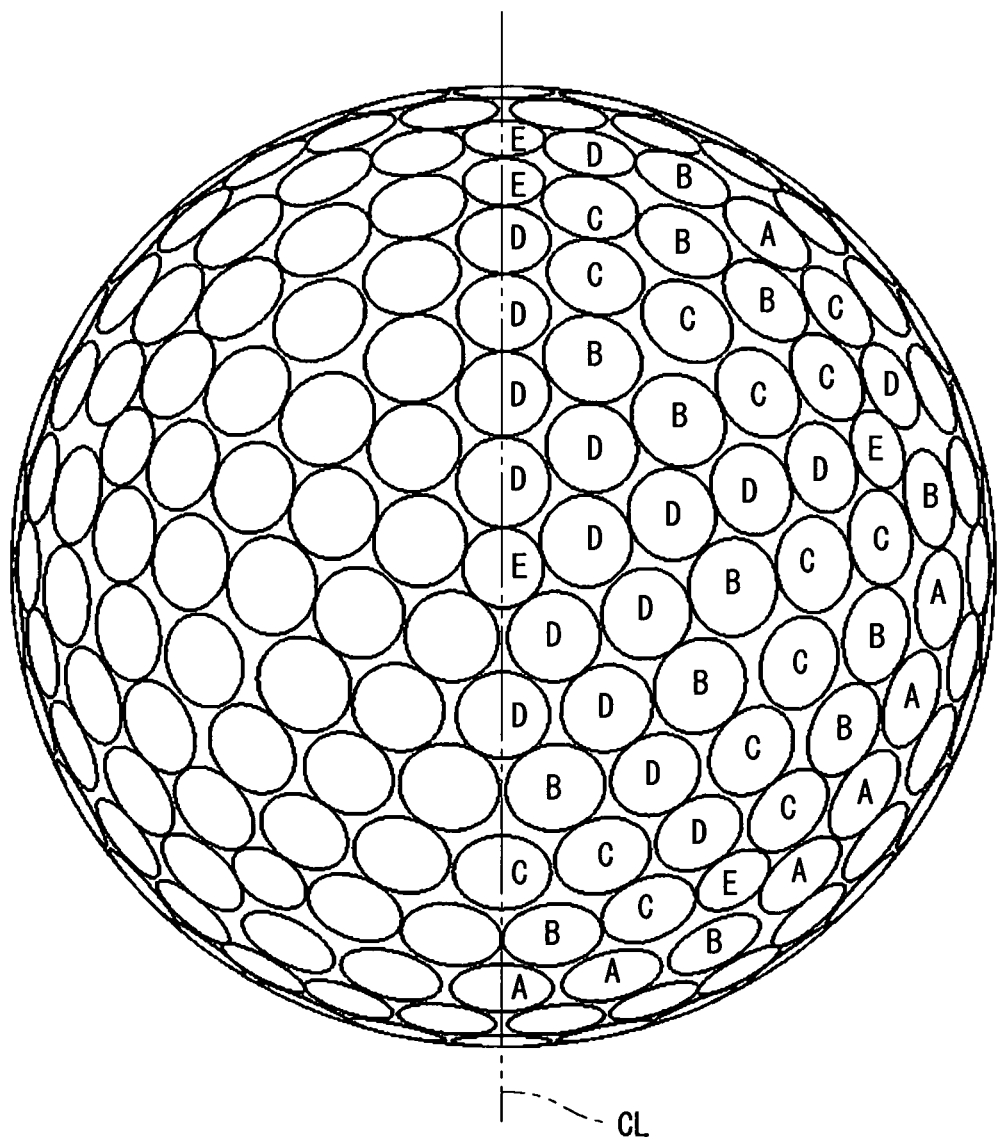
FIG. 13 shows a plan view illustrating a golf ball obtained with a mold according to Sample 5.
Figure 14:
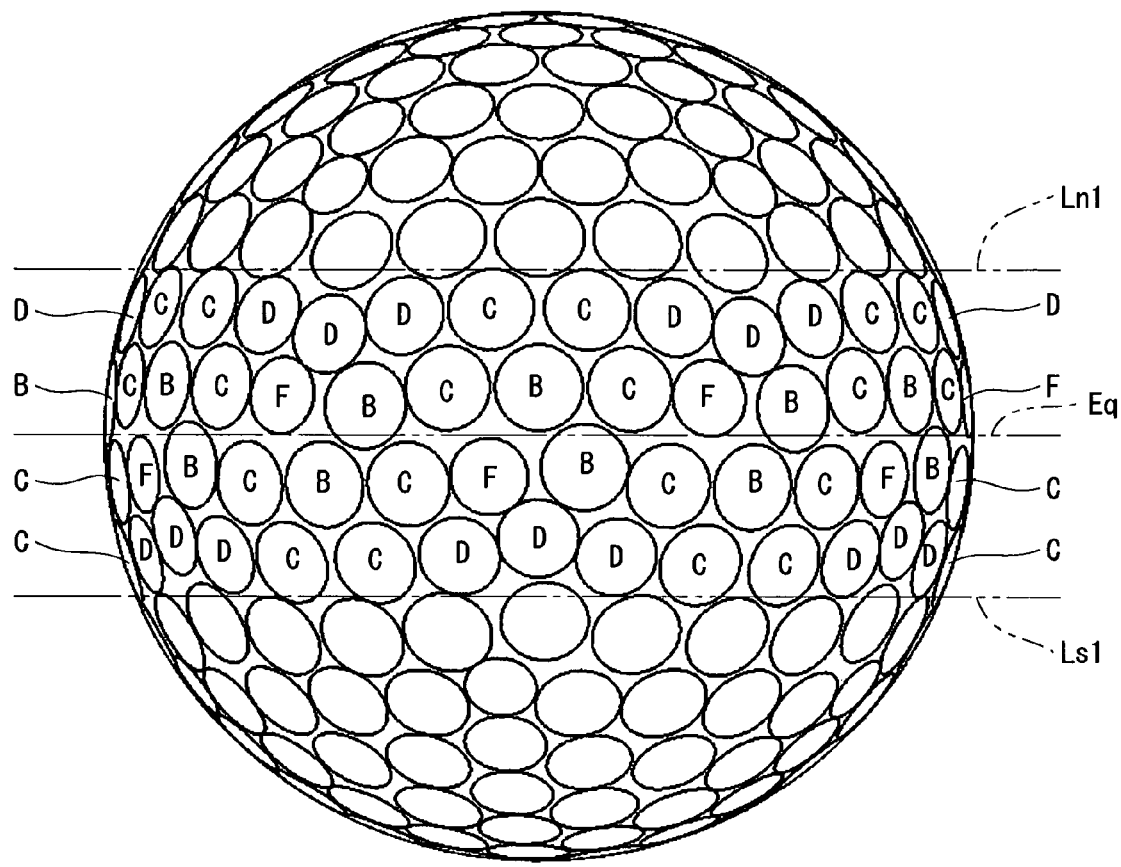
FIG. 14 shows a front view illustrating the golf ball shown in FIG. 13.
Figure 15:
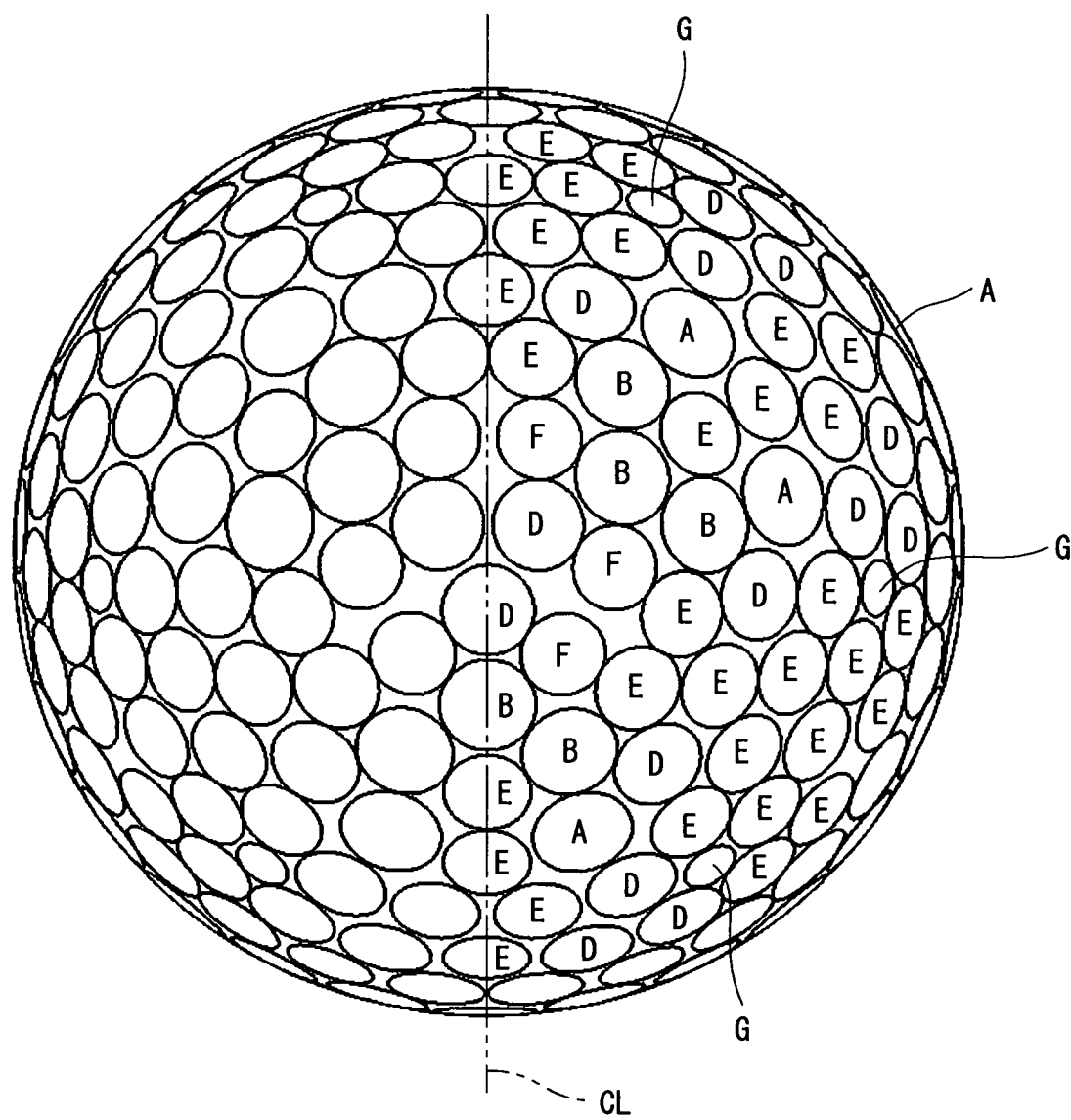
FIG. 15 shows a plan view illustrating a golf ball obtained with a mold according to Sample 6.
Figure 16:
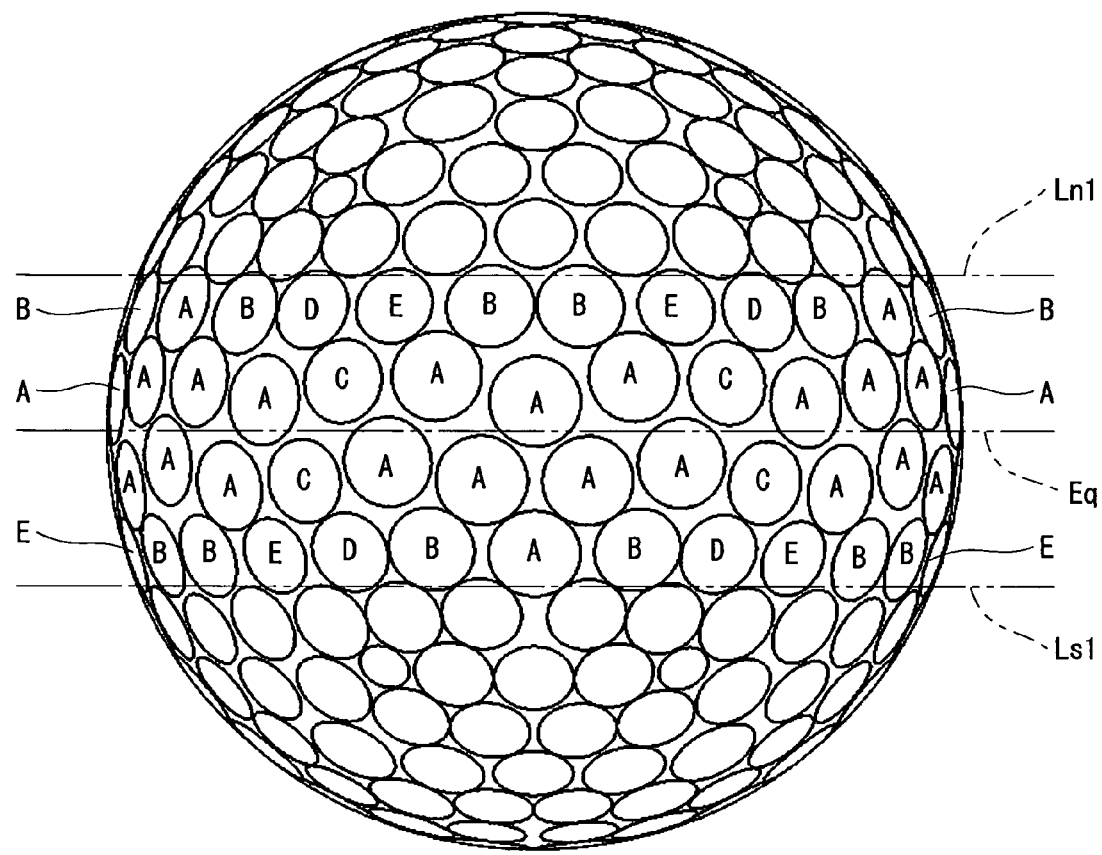
FIG. 16 shows a front view illustrating the golf ball shown in FIG. 15.
Figure 17:
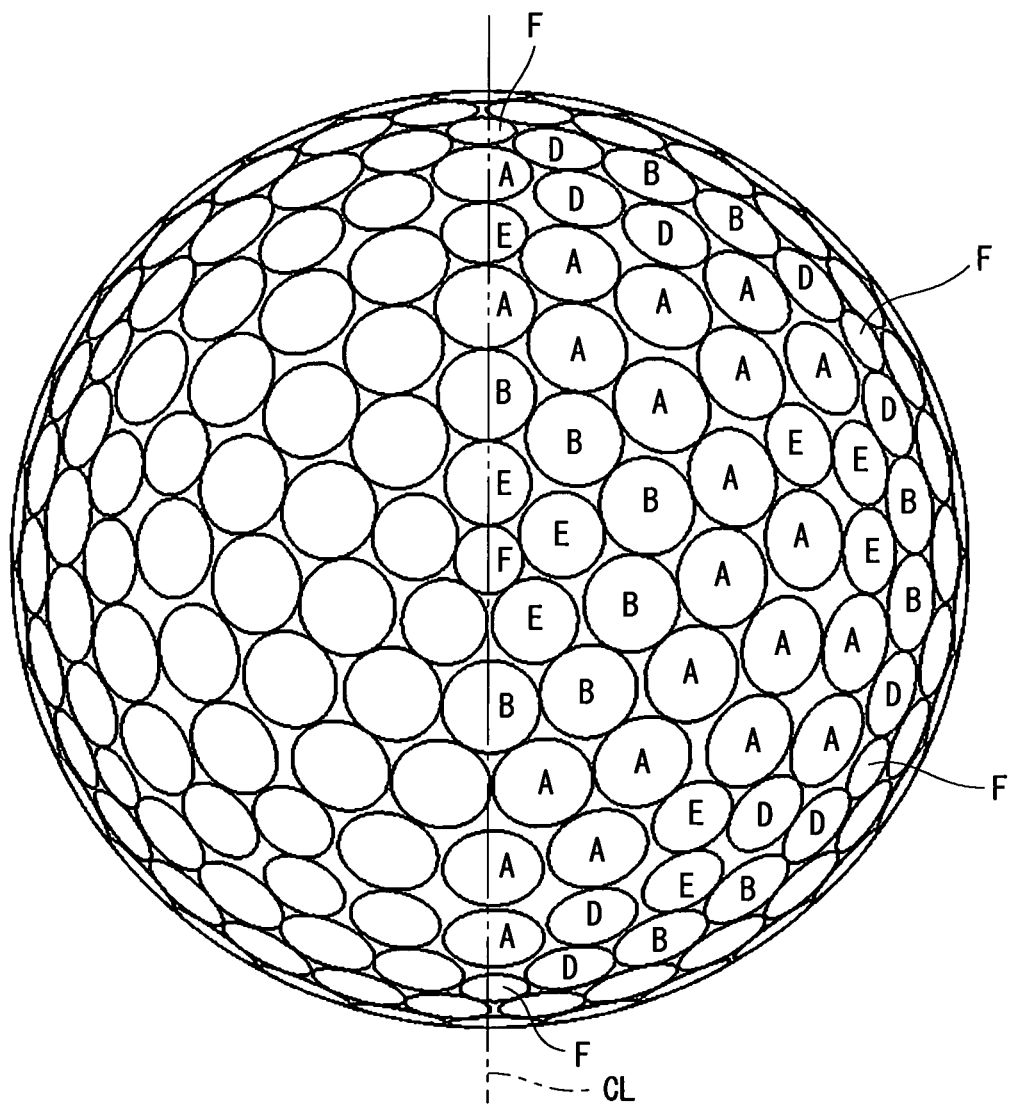
FIG. 17 shows a plan view illustrating a golf ball obtained with a mold according to Sample 7.
Figure 18:
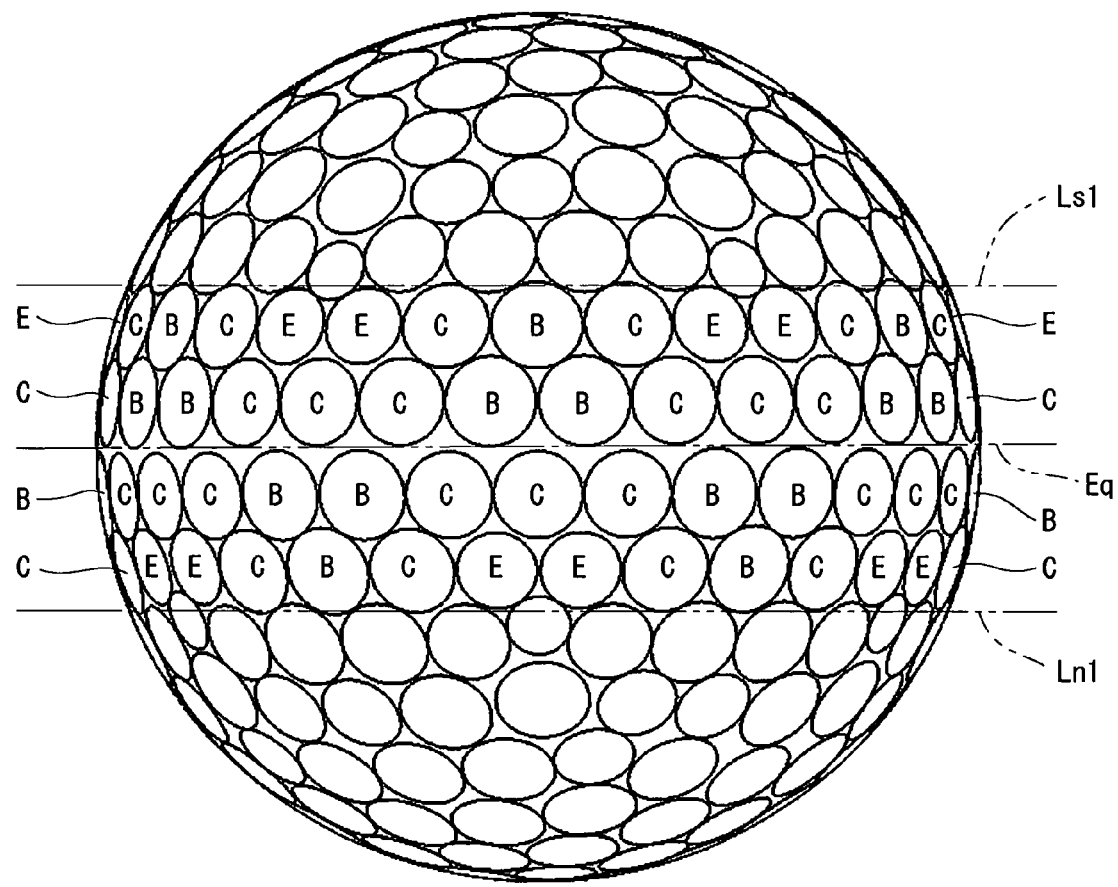
FIG. 18 shows a front view illustrating the golf ball shown in FIG. 17.

| | | Sample 1 | Sample 2 | Sample 3 | Sample 4 | Sample 5 | Sample 6 | Sample 7 |
|---|---|---|---|---|---|---|---|---|
| Pimples (entire cavity face) | Number | 324 | 330 | 324 | 324 | 324 | 330 | 330 |
| | Occupancy (%) | 80.6 | 78.8 | 79.2 | 79.5 | 79.9 | 78.8 | 81.6 |
| | $\Sigma 2$ | 0.19 | 0.38 | 0.21 | 0.21 | 0.20 | 0.38 | 0.36 |
| | Dx2/Dn2 | 1.16 | 1.33 | 1.19 | 1.19 | 1.18 | 1.33 | 1.30 |
| Pimple (low-latitude region) | Number | 120 | 102 | 120 | 120 | 120 | 102 | 120 |
| | $\Sigma 1$ | 0.12 | 0.20 | 0.17 | 0.19 | 0.15 | 0.20 | 0.21 |
| | Dx1/Dn1 | 1.07 | 1.15 | 1.13 | 1.13 | 1.13 | 1.15 | 1.16 |
| | Diameter range (mm) | 4.10-4.40 | 4.00-4.60 | 3.90-4.40 | 3.90-4.40 | 3.90-4.40 | 4.00-4.60 | 3.85-4.45 |
| | Kinds | 3 | 5 | 4 | 4 | 4 | 5 | 3 |
| Number of protrusions | | 24 | 24 | 24 | 24 | 12 | 18 | 0 |
| Angle $\theta 1-\theta 2$ (degree) | | 12.4-17.6 | 13.5-19.5 13.5-13.5 | 12.4-17.6 | 15.0-15.0 | 30.0-30.0 | 19.5-20.3 | — |
| Proportion Pw (%) | | 58.6 | 63.7 | 46.1 | 58.6 | 29.3 | 47.8 | 0 |
| Proportion P1 (%) | | 100 | 50 | 100 | 100 | 100 | 100 | — |
| Proportion P2 (%) | | 100 | 50 | 100 | 100 | 0 | 0 | — |
| Proportion P3 (%) | | 100 | 50 | 100 | 0 | 0 | 100 | — |
| Proportion P4 (%) | | 100 | 50 | 100 | 0 | 0 | 0 | — |
| Plan view | | FIG. 5 | FIG. 7 | FIG. 9 | FIG. 11 | FIG. 13 | FIG. 15 | FIG. 17 |
| Front view | | FIG. 6 | FIG. 8 | FIG. 10 | FIG. 12 | FIG. 14 | FIG. 16 | FIG. 18 |
| Flight distance (m) | Pole shot | 242.3 | 241.1 | 241.8 | 240.5 | 239.6 | 240.0 | 238.4 |
| | Seam shot | 242.0 | 240.3 | 241.3 | 239.5 | 238.4 | 238.5 | 236.4 |
| Appearance | | A | A | A | A | B | B | C |

Details of proportions Pw and P1-P4 in Table 3 are as follows.

Pw: proportion of the sum total of widths W of all the protrusions 16 to the entire length of the equator Eq.

P1: proportion of the number of the protrusion 16 that meets the following requirement 1 to the total number of the protrusions 16.

Requirement 1: being adjacent to other protrusion 16 belonging to other mold half that is distinct from the mold half to which itself belongs.

P2: proportion of the number of the protrusion 16 that meets the following requirement 2 to the total number of the protrusions 16.

Requirement 2: being adjacent to other protrusion 16 belonging to one mold half to which itself belongs, and also being adjacent to still other protrusion 16 belonging to another mold half that is distinct from the mold half to which itself belongs.

P3: proportion of the number of the protrusion 16 that meets the following requirement 3 to the total number of the protrusions 16.

Requirement 3: the central angle $\theta 1$ with respect to one adjacent protrusion 16 being different from the central angle $\theta 2$ with respect to another adjacent protrusion 16.

P4: proportion of the number of the protrusion 16 that meets both the aforementioned requirements 2 and 3 to the total number of the protrusions 16.

As shown in Table 3, the golf ball obtained with the mold according to the present invention is excellent in the aerodynamic symmetry. Therefore, advantages of the present invention are clearly suggested by these results of evaluation.

Golf balls having a variety of structures can be manufactured with the mold according to the present invention. The foregoing description is just for illustrative examples, and various modifications can be made in the scope without departing from the principles of the present invention.

What is claimed is:

1. A method of manufacturing a golf ball, the method comprising the steps of:
providing a golf ball mold comprising:
a cavity provided by a pair of mold halves mating at an equator of the mold, a cavity face of each mold half comprising a number of pimples extending into the cavity for forming golf ball dimples,
wherein a mating circumferential edge of each mold half is shaped with multiple flat planes lying along a single flat plane, each of the multiple flat planes separated either by a single mold half protrusion extending toward the other mold half or by a mold half recess which receives a single mold half protrusion of the other mold half upon mating the mold halves, and each protrusion comprising part of a pimple,
wherein upon mating the mold halves:
a proportion P1 of mold half protrusions arranged next adjacent to a protrusion of the other mold half, with respect to a total number of protrusions of both mold halves, is equal to or greater than 50%, and
a proportion P2 of mold half protrusions arranged next adjacent to a protrusion of both the same mold half and the other mold half, with respect to a total number of protrusions of both mold halves, is equal to or greater than 50%,
wherein a proportion Pw of a total sum of protrusion widths along the mold equator, with respect to an entire equator length, is equal to or greater than 46%, and
wherein a mold latitude region equal to or less than 20° comprises pimples having different diameters, all of which can be sorted in descending order so as to provide a ratio Dx/Dn of average top 10% diameter Dx with respect to average bottom 10% diameter Dn of equal to or less than 1.15 but larger than 1; placing a golf ball material into the mold cavity; and
allowing the material to flow into the mold cavity so as to conform to a golf ball shape having dimples, each dimple having an inverted shape of a corresponding pimple.

2. The method according to claim 1, wherein the total number of protrusions is 18 or greater and 33 or less.

3. The method according to claim 1, wherein a diameter of each pimple forming a protrusion is equal to or greater than 4.0 mm.

4. The method according to claim 1, wherein a diameter of each pimple present in a mold latitude region equal to or less than 20° is equal to or greater than 4.0 mm.

5. The method according to claim 1, wherein a height of each protrusion from the equator is identical.

6. The method according to claim 1, wherein a height of each protrusion from the equator is equal to greater than 0.2 mm and is equal to or less than 1.5 mm.

7. The method according to claim 1, wherein a standard deviation of diameters of all pimples present in a mold latitude region equal to or less than 20° is equal to or less than 0.15.

8. The method according to claim 1, wherein the proportion P1 is 100%.

9. The method according to claim 1, wherein the proportion P2 is 100%.

10. The method according to claim 1, wherein the proportion Pw is equal to or less than 90%.

11. The method according to claim 1, wherein the proportion Pw is equal to or greater than 59% and is equal to or less than 85%.

12. The method according to claim 1, wherein the ratio Dx/Dn is equal to or less than 1.07.

13. The method according to claim 1, wherein upon mating the mold halves, a central angle between each protrusion and each next adjacent protrusion is 10° or greater and 20° or less.

14. The method according to claim 1, wherein upon mating the mold halves, a central angle $\theta 1$ between one protrusion and a next adjacent protrusion arranged at one side thereof is different from a central angle $\theta 2$ between the one protrusion and yet another next adjacent protrusion arranged at an opposite side thereof.

15. The method according to claim 14, wherein a proportion P3 of the protrusions forming the central angles $\theta 1$ and $\theta 2$ with next adjacent protrusions arranged at opposite sides thereof, with respect to a total number of protrusions of both mold halves, is equal to or greater than 50%.

16. The method according to claim 15, wherein the proportion P3 is 100%.

17. The method according to claim 16, wherein the proportion P1 is 100%.

18. The method according to claim 17, wherein the proportion P2 is 100%.

19. The method according to claim 18, wherein the proportion Pw is equal to or greater than 59% and is equal to or less than 85%.

20. The method according to claim 19, wherein the ratio Dx/Dn is equal to or less than 1.07.

* * * * *